United States Patent
Jang et al.

(10) Patent No.: US 12,321,040 B2
(45) Date of Patent: Jun. 3, 2025

(54) OPTICAL IMAGING SYSTEM

(71) Applicant: Samsung Electro-Mechanics Co., Ltd., Suwon-si (KR)

(72) Inventors: Sang Hyun Jang, Suwon-si (KR); Jae Hyuk Huh, Suwon-si (KR); Ju Hwa Son, Suwon-si (KR); Jin Hwa Jung, Suwon-si (KR); Yong Joo Jo, Suwon-si (KR); Phil Ho Jung, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 890 days.

(21) Appl. No.: 17/148,017

(22) Filed: Jan. 13, 2021

(65) Prior Publication Data

US 2022/0113499 A1 Apr. 14, 2022

(30) Foreign Application Priority Data

Oct. 12, 2020 (KR) .................. 10-2020-0131364

(51) Int. Cl.
*G02B 9/64* (2006.01)
*G02B 9/62* (2006.01)
*G02B 13/00* (2006.01)
*G02B 13/08* (2006.01)
*G02B 27/00* (2006.01)

(52) U.S. Cl.
CPC .............. *G02B 9/64* (2013.01); *G02B 9/62* (2013.01); *G02B 13/0045* (2013.01); *G02B 13/08* (2013.01); *G02B 27/0025* (2013.01)

(58) Field of Classification Search
CPC ........ G02B 9/64; G02B 13/0045; G02B 9/62; G02B 27/0025; G02B 3/0087; G02B 13/18; G02B 2003/0093; G02B 13/08

USPC ................ 359/713, 668, 671, 752, 757, 758
See application file for complete search history.

(56) References Cited

U.S. PATENT DOCUMENTS

| | | | | |
|---|---|---|---|---|
| 5,731,908 | A * | 3/1998 | Kim .................. | G02B 13/08 359/671 |
| 11,480,765 | B2 | 10/2022 | Lin et al. | |
| 2016/0011401 | A1* | 1/2016 | Chen .................. | G02B 13/0045 359/713 |
| 2016/0341935 | A1 | 11/2016 | Chen et al. | |
| 2016/0377839 | A1 | 12/2016 | Chen et al. | |

(Continued)

FOREIGN PATENT DOCUMENTS

| CN | 106443961 A | 2/2017 |
|---|---|---|
| CN | 106802464 A | 6/2017 |

(Continued)

OTHER PUBLICATIONS

English Machine translation of WO2021134264 (Year: 2024).*

(Continued)

*Primary Examiner* — Cara E Rakowski
(74) *Attorney, Agent, or Firm* — NSIP Law

(57) ABSTRACT

An optical imaging system includes a first lens, a second lens, a third lens, a fourth lens, a fifth lens, and a sixth lens disposed in order from an object side. The first lens has refractive power having a sign different from a sign of refractive power of the second lens. One of an image-side surface of the fifth lens and an object-side surface of the sixth lens is convex, and the other is concave. One of the fourth to sixth lenses has both surfaces having a freeform surface shape.

14 Claims, 18 Drawing Sheets

(56) References Cited

U.S. PATENT DOCUMENTS

| | | |
|---|---|---|
| 2017/0045718 A1 | 2/2017 | Park |
| 2017/0153420 A1 | 6/2017 | Park |
| 2018/0074296 A1 | 3/2018 | Lee et al. |
| 2018/0074297 A1 | 3/2018 | Lee et al. |
| 2018/0172957 A1 | 6/2018 | Lee et al. |
| 2018/0188494 A1 | 7/2018 | Chang et al. |
| 2018/0188495 A1 | 7/2018 | Chang et al. |
| 2019/0227278 A1 | 7/2019 | Chen et al. |
| 2019/0302426 A1 | 10/2019 | Huang |
| 2020/0116982 A1 | 4/2020 | Matsumura |
| 2020/0192005 A1 | 6/2020 | Jung et al. |
| 2020/0209529 A1 | 7/2020 | Chae et al. |
| 2020/0301104 A1 | 9/2020 | Nitta et al. |
| 2021/0132338 A1* | 5/2021 | Lin ................. G02B 13/0045 |
| 2021/0236281 A1 | 8/2021 | Chen et al. |
| 2021/0255424 A1 | 8/2021 | Weng et al. |
| 2021/0255428 A1 | 8/2021 | Lin et al. |
| 2021/0263265 A1 | 8/2021 | Sun et al. |
| 2021/0263266 A1* | 8/2021 | Chen ................. G02B 13/18 |
| 2021/0263281 A1* | 8/2021 | Chen ................. G02B 13/06 |
| 2022/0337727 A1* | 10/2022 | Ye ................. G02B 13/06 |

FOREIGN PATENT DOCUMENTS

| | | | | |
|---|---|---|---|---|
| CN | 206946087 U | | 1/2018 | |
| CN | 107817575 A | | 3/2018 | |
| CN | 108205186 A | | 6/2018 | |
| CN | 108279480 A | | 7/2018 | |
| CN | 108279482 A | | 7/2018 | |
| CN | 109375348 A | | 2/2019 | |
| CN | 109597188 A | * | 4/2019 | ......... G02B 13/0045 |
| CN | 110068911 A | | 7/2019 | |
| CN | 111142230 A | | 5/2020 | |
| CN | 111142231 A | | 5/2020 | |
| CN | 111158114 A | | 5/2020 | |
| CN | 111175939 A | | 5/2020 | |
| CN | 111198435 A | | 5/2020 | |
| CN | 111208623 A | | 5/2020 | |
| CN | 111258036 A | | 6/2020 | |
| CN | 111308651 A | | 6/2020 | |
| CN | 111399170 A | | 7/2020 | |
| CN | 112764195 A | | 5/2021 | |
| CN | 213210573 U | * | 5/2021 | |
| JP | 2019-32540 A | | 2/2019 | |
| KR | 10-2019-0087261 A | | 7/2019 | |
| TW | I706185 B | | 10/2020 | |
| TW | I712816 B | | 12/2020 | |
| WO | WO 2018/230034 A1 | | 12/2018 | |
| WO | WO-2021134264 A1 | * | 7/2021 | |
| WO | WO-2021134282 A1 | * | 7/2021 | |
| WO | WO-2021134287 A1 | * | 7/2021 | ......... G02B 13/0015 |

OTHER PUBLICATIONS

Gross, Herbert. Handbook of Optical Systems vol. 3: Aberration Theory and Correction of Optical Systems. 2007. Wiley-VCH Verlag GmbH & Co. pp. 378-379. (Year: 2007).*
Machine translation of CN 109597188 retrieved electronically from Espacenet Oct. 5, 2024 (Year: 2024).*
Chinese Office Action issued on Feb. 2, 2024, in counterpart Chinese Patent Application No. 202110522195.6 (7 pages in English, 18 pages in Chinese).
Korean Office Action issued on Oct. 11, 2023, in counterpart Korean Patent Application No. 10-2023-0051127 (5 pages in English, 4 pages in Korean).
Taiwanese Office Action issued on Nov. 5, 2021, in counterpart Taiwanese Patent Application No. 110102428 (9 pages in English and 11 pages in Mandarin).
Korean Office Action issued on Jan. 21, 2022, in counterpart Korean Patent Application No. 10-2020-0131364 (9 pages in English and 7 pages in Korean).
Korean Office Action issued on Jul. 23, 2022, in counterpart Korean Patent Application No. 10-2020-0131364 (4 pages in English and 4 pages in Korean).
Chinese Office Action issued on Sep. 19, 2024, in counterpart Chinese Patent Application No. 202110522195.6 (7 pages in English, 10 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2020-0131364 filed on Oct. 12, 2020, in the Korean Intellectual Property Office, the entire disclosure of which is incorporated herein by reference for all purposes.

BACKGROUND

1. Field

The present disclosure relates to an optical imaging system configured to improve ray aberration.

2. Description of the Background

An optical imaging system generally includes a plurality of lenses and an image sensor. A lens may be formed to have a shape of substantial rotational symmetry around an optical axis. For example, a lens may be formed to have a substantially circular shape. Since a circular lens may be manufactured through injection molding, mass production thereof may be facilitated.

Unlike the lens, the image sensor is generally formed to have a rectangular shape rather than a circular shape. For example, the image sensor may be formed to have a substantially rectangular shape. The image sensor is generally formed to be larger than the lens. For example, a maximum effective radius of the lens is generally smaller than an image height of the image sensor (half of a diagonal length of the image sensor).

The above-described differences in shapes and sizes between the lens and the image sensor may impede improvements of aberration of the optical imaging system. Accordingly, there is a need for development of an optical imaging system capable of improving optical performance depending on differences in shapes and sizes between a lens and an image sensor.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens disposed in order from an object side. The first lens has refractive power having a sign different from a sign of refractive power of the second lens. One of an image-side surface of the fifth lens and an object-side surface of the sixth lens is convex, and the other is concave. One of the fourth to sixth lenses has both surfaces having a freeform surface shape.

The first lens may have positive refractive power.
The fourth lens may have negative refractive power.
A half field of view (HFOV) of the optical imaging system may be 20 to 46 degrees.

The fifth lens may have a convex image-side surface.
The sixth lens may have a concave image-side surface.
The fifth lens may have negative refractive power.
The sixth lens may have a convex image-side surface.
The first lens may have negative refractive power.
The fourth lens may have positive refractive power.
The sixth lens may have a concave image-side surface.
A half field of view (HFOV) of the optical imaging system may be 52 to 68 degrees.

A camera module may include the optical imaging system, and an image sensor configured to convert an optical signal of the optical imaging system into an electrical signal.

A mobile terminal device may include the camera module.

A mobile terminal device may include a plurality of camera modules, wherein the plurality of camera modules may include one or more camera modules having the optical imaging system and the image sensor.

In another general aspect, an optical imaging system includes a first lens having a convex object-side surface, a second lens having refractive power, a third lens having refractive power, a fourth lens having a concave image-side surface, a fifth lens having positive or negative refractive power, and a sixth lens having refractive power having a sign different from a sign of the refractive power of the fifth lens, wherein the first to sixth lenses are disposed in order from an object side, and wherein one of the fourth to sixth lenses has both surfaces having a freeform surface shape.

The second lens may have a concave image-side surface.
The fifth lens may have a concave image-side surface or the sixth lens may have a concave object-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
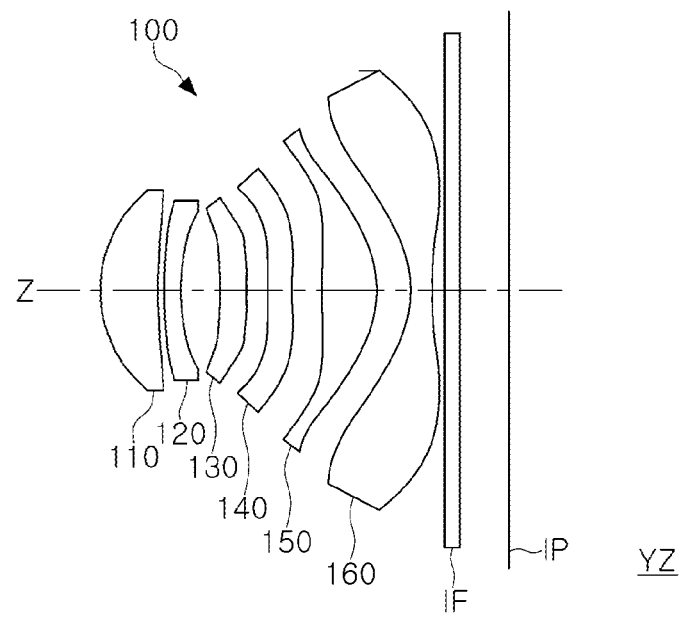
FIG. 1 is a side view of an optical imaging system according to a first example in a Y-Z direction.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide an optical imaging system configured to improve optical performance depending on differences in shapes and sizes between a lens and an image sensor.

An optical imaging system includes a plurality of lenses disposed along an optical axis. The plurality of lenses may be spaced apart from each other by predetermined distances along the optical axis.

For example, the optical imaging system includes a first lens, a second lens, a third lens, a fourth lens, a fifth lens, and a sixth lens sequentially disposed in ascending numerical order along the optical axis from an object side of the optical imaging system toward an imaging plane of the optical imaging system, with the first lens being closest to the object side of the optical imaging system and the sixth lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

In the examples, a first lens refers to a lens most adjacent to an object (or a subject), and a sixth lens refers to a lens most adjacent to an imaging plane (or an image sensor). In the examples, units of a radius of curvature, a thickness, a total track length (TTL) (an axial distance between the object-side surface of the first lens and the imaging plane), an IMGHT (half of a diagonal length of an imaging plane), and a focal length are indicated in millimeters (mm). A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

An optical imaging system according to the present disclosure may adjust aberration of rays reaching an image sensor using a non-rotationally symmetrical lens. For example, the optical imaging system may include a lens having a freeform surface. Freeform surfaces may be formed on both surfaces of the lens. The optical imaging system may be mounted in a camera module for a mobile terminal device. However, the application range of the optical imaging system is not limited to the camera module for a mobile terminal device. In addition, the optical imaging system may be selectively applied to a plurality of camera modules. As an example, the optical imaging system may be applied to one camera module, among two or more camera modules mounted in a mobile terminal device. As another example, the optical imaging system may be applied to one or more camera modules, among three or more camera modules mounted in a mobile terminal device.

In the description below, an optical imaging system according to one or more examples will be described.

An optical imaging system according to an example may include a plurality of lenses. For example, the optical imaging system may include a first lens, a second lens, a third lens, a fourth lens, a fifth lens, and a sixth lens disposed in order from an object side. Each of the first to sixth lenses may have predetermined refractive power. The refractive power of the first lens and the refractive power of the second lens may have a predetermined correlation. For example, the first lens may have refractive power having a sign different from a sign of the refractive power of the second lens. For example, when the second lens has positive refractive power, the first lens may have negative refractive power. As another example, when the second lens has negative refractive power, the first lens may have positive refractive power. A shape of the fifth lens and a shape of the sixth lens may have a predetermined correlation. For example, one of an image-side surface of the fifth lens and an object-side surface of the sixth lens may be convex, and the other surface may be concave. As an example, when the image-side surface of the fifth lens is convex, the object-side surface of the sixth lens is concave. As another example, when the image-side surface of the fifth lens is concave, the object-side surface of the sixth lens is convex. The optical imaging system may include a non-rotationally symmetrical lens. For example, one of the fourth to sixth lenses may have both surfaces having a freeform surface shape.

The optical imaging system according to an example may have features varying depending on the refractive power of the first lens. For example, the refractive power of the fourth lens and a half field of view (HFOV) of the optical imaging system may vary according to the refractive power of the first lens. For example, when the first lens has positive refractive power, a HFOV of the optical imaging system may be 20 to 46 degrees. As another example, when the first lens has negative refractive power, a HFOV of the optical imaging system may be 52 to 68 degrees.

In the description below, features of the lenses, constituting the optical imaging system according to one or more examples, will be described.

The first lens may have refractive power. For example, the first lens may have positive refractive power or negative refractive power. The first lens may have an aspherical surface. For example, both surfaces of the first lens may be aspherical. The first lens may have a predetermined refractive index. For example, the refractive index of the first lens may be 1.5 or more to less than 1.6.

The second lens may have refractive power. For example, the second lens may have positive or negative refractive power. The second lens may have an aspherical surface. For example, both surfaces of the second lens may be aspherical. The second lens may have a predetermined refractive index. For example, the refractive index of the second lens may be 1.5 or more to less than 1.7. The refractive index of the second lens may be greater than or equal to the refractive index of the first lens.

The third lens may have refractive power. For example, the third lens may have positive or negative refractive power. The third lens may have an aspherical surface. For example, both surfaces of the third lens may be aspherical. The third lens may have a predetermined refractive index. For example, the refractive index of the first lens may be 1.5 or more to less than 1.7.

The fourth lens may have refractive power. For example, the fourth lens may have positive or negative refractive power. The refractive power of the fourth lens may have a sign different from a sign of the refractive power of the first lens. For example, when the first lens has positive refractive power, the fourth lens may have negative refractive power. Meanwhile, when the first lens has negative refractive power, the fourth lens may have positive refractive power. The fourth lens may have an aspherical surface. For example, both surfaces of the fourth lens may be aspherical. The fourth lens may have a freeform surface, as necessary. For example, when both surfaces of both the fifth lens and the sixth lens are rotationally symmetrical, both surfaces of the fourth lens may be formed as freeform surfaces. The fourth lens may have a predetermined refractive index. For example, the refractive index of the fourth lens may be 1.5 or more to less than 1.7.

The fifth lens may have refractive power. For example, the fifth lens may have positive refractive power or negative refractive power. One surface of the fifth lens may be convex or concave. For example, the fifth lens may have a convex object-side surface. Alternatively, the fifth lens may have a concave image-side surface. The fifth lens may have an aspherical surface. For example, both surfaces of the fifth lens may be aspherical. The fifth lens may have a freeform surface, as necessary. For example, when both surfaces of both the fourth lens and the sixth lens are rotationally symmetrical, both surfaces of the fifth lens may be formed as freeform surfaces. The fifth lens may have a predetermined refractive index. For example, the refractive index of the fifth lens may be 1.5 or more to less than 1.7.

The sixth lens may have refractive power. For example, the sixth lens may have positive refractive power or negative refractive power. One surface of the sixth lens may be convex or concave. For example, the sixth lens may have a convex object-side surface. Alternatively, the sixth lens may have a concave image-side surface. However, the shape of the sixth lens is not limited to the above example. For example, when the fifth lens has negative refractive power, the sixth lens may have a convex image-side surface. The sixth lens may have an aspherical surface. For example, both surfaces of the sixth lens may be aspherical. The sixth lens may have a freeform surface, as necessary. For example, when both surfaces of both the fourth lens and the fifth lens are rotationally symmetrical, both surfaces of the sixth lens may be formed as freeform surfaces. The sixth lens may have a predetermined refractive index. For example, the refractive index of the sixth lens may be 1.5 or more to less than 1.7.

In the description below, an optical imaging system according to one or more further examples will be described.

An optical imaging system according to another example may include a plurality of lenses. For example, the optical imaging system may include a first lens, a second lens, and a third lens, each having a convex object-side surface, and a fourth lens, a fifth lens, and a sixth lens, each having a concave image-side surface. The first to sixth lenses may be disposed in order from an object side. For example, the first lens may be disposed to be closest to an object, and the sixth lens may be disposed to be closest to an imaging plane (or an image sensor). The first to sixth lenses may have refractive power. For example, the first to sixth lenses may have positive or negative refractive power. The refractive power of the fifth lens and the refractive power of the sixth lens may have a predetermined correlation. For example, the sixth lens may have refractive power having a sign different from a sign of the refractive power of the fifth lens. As an example, when the fifth lens has positive refractive power, the sixth lens may have negative refractive power. As another example, when the fifth lens has negative refractive power, the sixth lens may have positive refractive power. The optical imaging system may include a non-rotationally symmetrical lens. For example, one of the fourth to sixth lenses may have both surfaces having a freeform surface shape.

In the description below, features of the lenses, constituting the optical imaging system, will be described.

The first lens may have refractive power. For example, the first lens may have positive refractive power or negative refractive power. The first lens may have an aspherical surface. For example, both surfaces of the first lens may be aspherical. The first lens may have a predetermined refractive index. For example, the refractive index of the first lens may be 1.5 or more to less than 1.6.

The second lens may have refractive power. For example, the second lens may have positive or negative refractive power. One surface of the second lens may be concave. For example, the second lens may have a concave image-side surface. The second lens may have an aspherical surface. For example, both surfaces of the second lens may be aspherical. The second lens may have a predetermined refractive index. For example, the refractive index of the second lens may be 1.5 or more to and less than 1.7. The refractive index of the second lens may be greater than or equal to the refractive index of the first lens.

The third lens may have refractive power. For example, the third lens may have positive or negative refractive power. The third lens may have an aspherical surface. For example, both surfaces of the third lens may be aspherical. The third lens may have a predetermined refractive index. For example, the refractive index of the first lens may be 1.5 or more to less than 1.7.

The fourth lens may have refractive power. For example, the fourth lens may have positive or negative refractive power. The refractive power of the fourth lens may have refractive power having a sign different from a sign of the refractive power of the first lens. For example, when the first lens has positive refractive power, the fourth lens may have negative refractive power. Meanwhile, when the first lens has negative refractive power, the fourth lens may have positive refractive power. The fourth lens may have an aspherical surface. For example, both surfaces of the fourth lens may be aspherical. The fourth lens may have a freeform surface, as necessary. For example, when both surfaces of both the fifth lens and the sixth lens are rotationally symmetrical, both surfaces of the fourth lens may be formed as freeform surfaces. The fourth lens may have a predetermined refractive index. For example, the refractive index of the fourth lens may be 1.5 or more to less than 1.7.

The fifth lens may have refractive power. For example, the fifth lens may have positive refractive power or negative refractive power. The fifth lens may have an aspherical surface. For example, both surfaces of the fifth lens may be aspherical. The fifth lens may have a freeform surface, as necessary. For example, when both surfaces of both the fourth lens and the sixth lens are rotationally symmetrical, both surfaces of the fifth lens may be formed as freeform surfaces. The fifth lens may have a predetermined refractive index. For example, the refractive index of the fifth lens may be 1.5 or more to less than 1.7.

The sixth lens may have refractive power. For example, the sixth lens may have positive refractive power or negative refractive power. The sixth lens may have an aspherical surface. For example, both surfaces of the sixth lens may be aspherical. The sixth lens may have a freeform surface, as necessary. For example, when both surfaces of both the fourth lens and the fifth lens are rotationally symmetrical, both surfaces of the sixth lens may be formed as freeform surfaces. The sixth lens may have a predetermined refractive index. For example, the refractive index of the sixth lens may be 1.5 or more to less than 1.7.

One of the fifth lens and the sixth lens may have a concave shape. For example, the fifth lens may have a concave image-side surface, or the sixth lens may have a concave object-side surface.

A lens, constituting an optical imaging system, may be formed of a material having a refractive index different from a refractive index of air. For example, the lens may be formed of a plastic material or a glass material. As described above, each of the first to sixth lenses may have an aspherical surface. An aspherical surface of each of the first to sixth lenses may be represented by Equation 1, as below:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{(Equation 1)}$$

In Equation 1, "c" is an inverse of a radius of a curvature of a respective lens, "k" is a conic constant, "r" is a distance from a certain point on an aspherical surface of the lens to an optical axis, "A" to "H" and "J" are aspheric constants, "Z" (or SAG) is a height from a certain point on an aspherical surface to an apex of the aspherical surface in an optical axis direction.

A freeform surface of a lens may be represented by Equations 2 and 3 using an XY polynomial, as below:

$$Z = \frac{cr^2}{1+\sqrt{1-(1+k)c^2r^2}} + \sum_{j=2}^{66} C_j x^m y^n \quad \text{(Equation 2)}$$

$$r^2 = x^2 + y^2 \quad \text{(Equation 3)}$$

An optical imaging system may further include a filter, a stop, and an image sensor.

The filter may be disposed between the image sensor and a lens disposed to be closest to an imaging plane. The filter may block some wavelengths from incident light to improve resolution of the optical imaging system. For example, the filter may block infrared wavelengths of the incident light. The optical imaging system may include an image sensor. The image sensor may be configured to convert an optical signal (image) into an electrical signal. A surface of the image sensor may form an imaging plane disposed at the imaging plane of the optical imaging system.

The optical imaging system may satisfy one or more of the following conditional expressions.

$-4.0 < f1/f2 < -0.1$ $0.5 < |f1/f5| < 2.0$ $-2.0 < f5/f6 < -0.1$ $0.10 < R10/R11 < 3.0$ $5.0 \text{ μm} \leq \text{SAGdifSO} < 150 \text{ μm}$ $5.0 \text{ μm} \leq \text{SAGdifSI} < 800 \text{ μm}$ $0.03 < \text{SAGdifSO}/\text{SAGdifSI} < 1.2$ $0.6 < \text{TTL}/(\text{IMGHT}*2) < 1.1$ In the above conditional expressions, f1 is a focal length of the first lens, f2 is a focal length of the second lens, f5 is a focal length of the fifth lens, f6 is a focal length of the sixth lens, R10 is a radius of curvature of the image-side surface of the fifth lens, R11 is a radius of curvature of the object-side surface of the sixth lens, SAGdifSO is a deviation between an X-direction SAG and a Y-direction SAG of an object-side surface of a lens having a freeform surface, SAGdifSI is a deviation between an X-direction SAG and a Y-direction SAG of an image-side surface of the lens having the freeform surface, total track length (TTL) is an axial distance between the object-side surface of the first lens and the imaging plane, and IMGHT is a height of the imaging plane (half of a diagonal length).

In the description below, various examples of an optical imaging system will be described.

Figure 2:
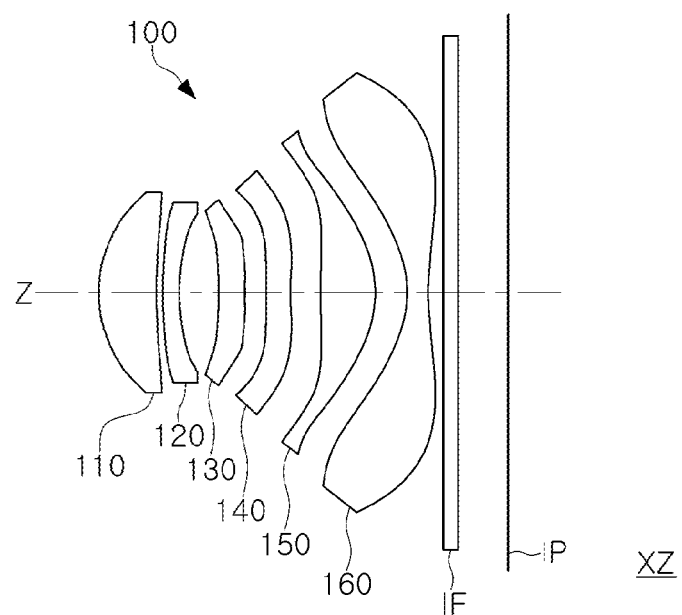
FIG. 2 is a side view of the optical imaging system according to the first example in an X-Z direction.

Hereinafter, an optical imaging system 100 according to a first example will be described with reference to FIGS. 1 and 2. FIG. 1 illustrates the optical imaging system 100 in a Y-Z direction, and FIG. 2 illustrates the optical imaging system 100 in an X-Z direction.

The optical imaging system 100 may include a first lens 110, a second lens 120, a third lens 130, a fourth lens 140, a fifth lens 150, and a sixth lens 160.

The first lens 110 may have positive refractive power. The first lens 110 may have a convex object-side surface and a concave image-side surface. The second lens 120 may have negative refractive power. The second lens 120 may have a convex object-side surface and a concave image-side surface. The third lens 130 may have positive refractive power. The third lens 130 may have a convex object-side surface and a convex image-side surface. The fourth lens 140 may have negative refractive power. The fourth lens 140 may have a convex object-side surface and a concave image-side surface. The fifth lens 150 may have positive refractive power. The fifth lens 150 may have a convex object-side surface and a convex image-side surface. Inflection points may be formed on the object-side surface and the image-side surface of the fifth lens 150. The sixth lens 160 may have negative refractive power. The sixth lens 160 may have a concave object-side surface and a concave image-side surface. The object-side surface and the image-side surface of the sixth lens 160 are formed as freeform surfaces.

The optical imaging system 100 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electrical signal.

Figure 3:
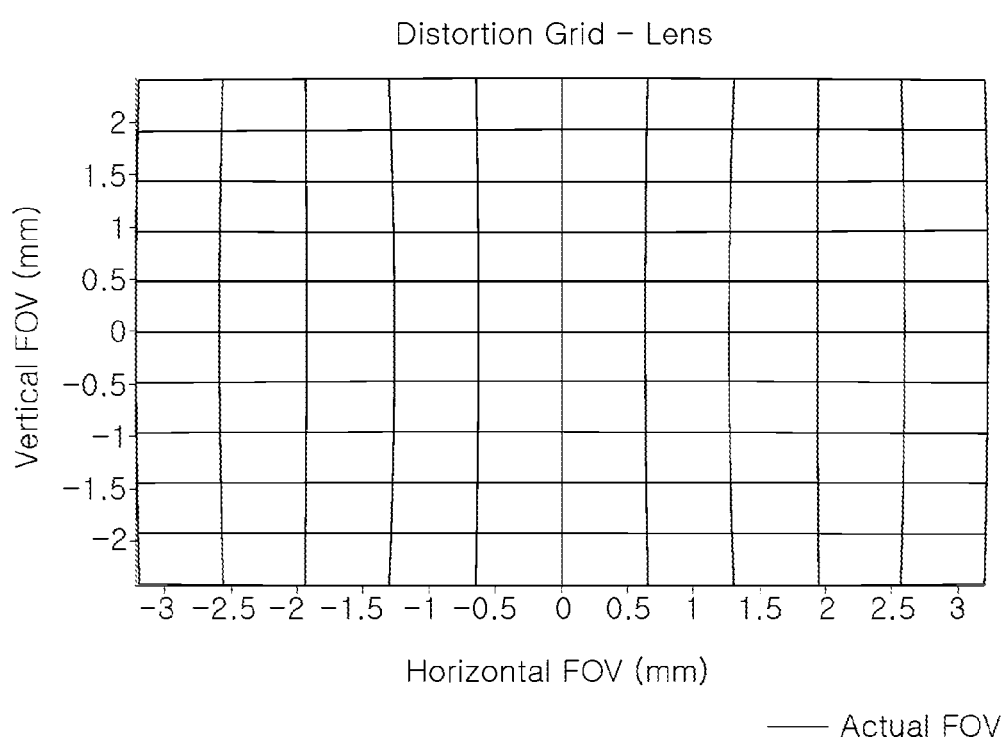
FIG. 3 is a graph illustrating distortion aberrations of the optical imaging system according to the first example.
Figure 4:
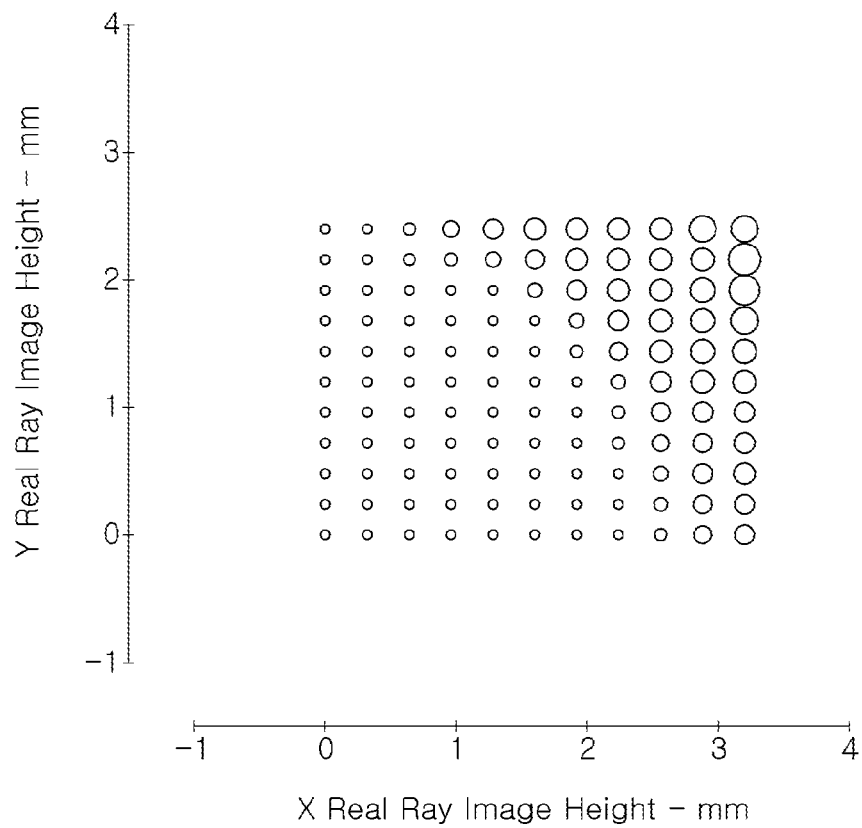
FIG. 4 is a graph illustrating root-mean-square (RMS) spots of the optical imaging system according to the first example.

Lens characteristics of the optical imaging system 100 according to the first example are listed in Table 1, aspherical values of the optical imaging system 100 according to the first example are listed in Table 2, and X"Y" coefficient values of a monomial expression, representing a freeform surface of the optical imaging system 100 according to the first example, are listed in Table 3. FIGS. 3 and 4 are views illustrating aberration curves of the above-configured optical imaging system 100.

TABLE 1

| Surface No. | Note | Radius of Curvature | Thickness/ Distance | Refractive Index | Abbe Number | Effective Radius |
|---|---|---|---|---|---|---|
| S1 | First Lens | 1.923 | 0.808 | 1.546 | 55.990 | 1.440 |
| S2 | | 7.344 | 0.084 | | | 1.371 |
| S3(STOP) | Second Lens | 4.798 | 0.230 | 1.677 | 19.238 | 1.290 |
| S4 | | 3.010 | 0.544 | | | 1.140 |

TABLE 1-continued

| Surface No. | Note | Radius of Curvature | Thickness/ Distance | Refractive Index | Abbe Number | Effective Radius |
|---|---|---|---|---|---|---|
| S5 | Third Lens | 98.881 | 0.366 | 1.546 | 55.990 | 1.180 |
| S6 | | −50.756 | 0.302 | | | 1.325 |
| S7 | Fourth Lens | 11.518 | 0.335 | 1.677 | 19.238 | 1.468 |
| S8 | | 6.545 | 0.420 | | | 1.751 |
| S9 | Fifth Lens | 7.192 | 0.763 | 1.546 | 55.990 | 2.150 |
| S10 | | −1.614 | 0.470 | | | 2.337 |
| S11 | Sixth Lens | −1.603 | 0.300 | 1.546 | 55.990 | 2.848 |
| S12 | | 4.762 | 0.177 | | | 3.205 |
| S13 | Filter | infinity | 0.210 | 1.518 | 64.166 | 3.813 |
| S14 | | infinity | 0.670 | | | 3.874 |
| S15 | Imaging Plane | infinity | 0.020 | | | |

TABLE 2

| Surface No. | S1 | S2 | S3 | S4 | S5 |
|---|---|---|---|---|---|
| K | −0.02463 | −18.82319 | −24.29553 | −2.54715 | −50.42694 |
| A | 0.01052 | −0.05804 | −0.07712 | −0.02662 | −0.06706 |
| B | −0.03910 | 0.08979 | 0.14502 | 0.00748 | 0.06705 |
| C | 0.10760 | −0.08341 | −0.18688 | 0.29164 | −0.21308 |
| D | −0.16927 | 0.02806 | 0.20428 | −0.96008 | 0.26468 |
| E | 0.16509 | 0.03861 | −0.16091 | 1.72741 | −0.10030 |
| F | −0.10036 | −0.06076 | 0.08006 | −1.88878 | −0.17839 |
| G | 0.03674 | 0.03741 | −0.02048 | 1.25002 | 0.25761 |
| H | −0.00734 | −0.01122 | 0.00122 | −0.46007 | −0.13238 |
| J | 0.00060 | 0.00134 | 0.00033 | 0.07263 | 0.02484 |

| Surface No. | S6 | S7 | S8 | S9 | S10 |
|---|---|---|---|---|---|
| K | 99.00000 | 57.69477 | −11.80172 | −96.73568 | −6.33624 |
| A | −0.07657 | −0.20344 | −0.19136 | −0.04917 | −0.09923 |
| B | −0.06556 | 0.20314 | 0.13606 | −0.01796 | 0.06664 |
| C | 0.41641 | −0.29352 | −0.06897 | 0.04202 | −0.04371 |
| D | −1.14173 | 0.36080 | −0.00939 | −0.03452 | 0.02499 |
| E | 1.69747 | −0.35705 | 0.04078 | 0.01634 | −0.01000 |
| F | −1.52045 | 0.24054 | −0.03056 | −0.00494 | 0.00253 |
| G | 0.81553 | −0.09984 | 0.01221 | 0.00094 | −0.00038 |
| H | −0.24069 | 0.02358 | −0.00259 | −0.00010 | 0.00003 |
| J | 0.02998 | −0.00252 | 0.00023 | 0.00000 | 0.00000 |

TABLE 3

| Note | S11(XY polynomial) | S12(XY polynomial) |
|---|---|---|
| K | −5.247311983 | −0.633607968 |
| $X^4$ | −0.046419321 | −0.037912874 |
| $X^2*Y^2$ | −0.092505758 | −0.075584121 |
| $Y^4$ | −0.045677685 | −0.036692250 |
| $X^6$ | 0.010762109 | 0.005201984 |
| $X^4*Y^2$ | 0.033147991 | 0.015867212 |
| $X^2*Y^4$ | 0.032647984 | 0.015809116 |
| $Y^6$ | 0.010520166 | 0.004884637 |
| $X^8$ | −0.000824043 | −0.000542624 |
| $X^6*Y^2$ | −0.003535020 | −0.002126024 |
| $X^4*Y^4$ | −0.005317549 | −0.003288797 |
| $X^2*Y^6$ | −0.003342676 | −0.002092199 |
| $Y^8$ | −0.000760797 | −0.000502259 |
| $X^{10}$ | 0.000021441 | 0.000019136 |
| $X^8*Y^2$ | 0.000105278 | 0.000083851 |
| $X^6*Y^4$ | 0.000256833 | 0.000181843 |
| $X^4*Y^6$ | 0.000206103 | 0.000180055 |
| $X^2*Y^8$ | 0.000104012 | 0.000081805 |
| $Y^{10}$ | 0.000017093 | 0.000019739 |

Figure 5:
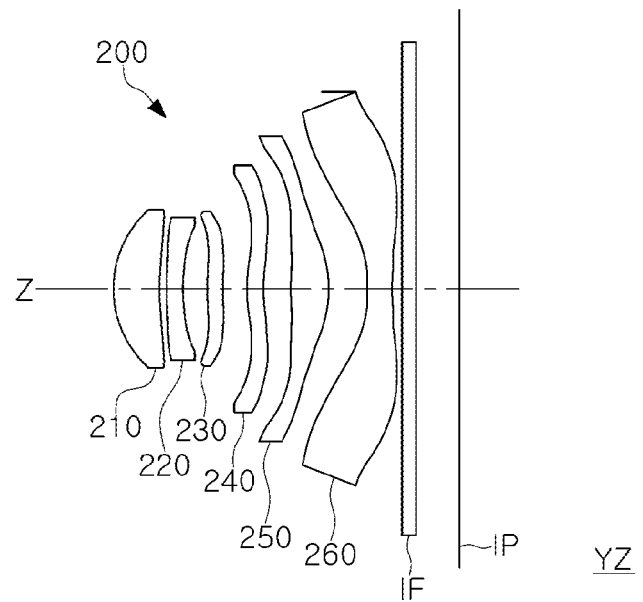
FIG. 5 is a side view of an optical imaging system according to a second example in a Y-Z direction.
Figure 6:
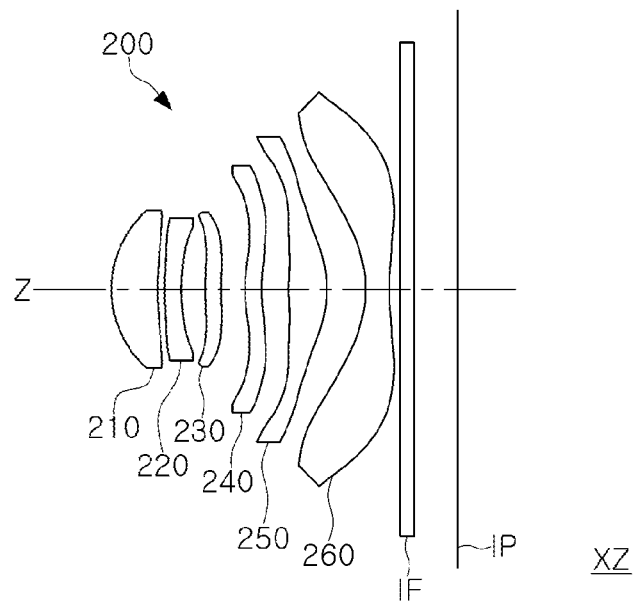
FIG. 6 is a side view of the optical imaging system according to the second example in an X-Z direction.

Hereinafter, an optical imaging system 200 according to a second example will be described with reference to FIGS. 5 and 6. FIG. 5 illustrates the optical imaging system 200 in a Y-Z direction, and FIG. 6 illustrates the optical imaging system 200 in an X-Z direction.

The optical imaging system 200 may include a first lens 210, a second lens 220, a third lens 230, a fourth lens 240, a fifth lens 250, and a sixth lens 260.

The first lens 210 may have positive refractive power. The first lens 210 may have a convex object-side surface and a concave image-side surface. The second lens 220 may have negative refractive power. The second lens 220 may have a convex object-side surface and a concave image-side surface. The third lens 230 may have positive refractive power. The third lens 230 may have a convex object-side surface and a concave image-side surface. Inflection points may be formed on the object-side surface and the image-side surface of the third lens 230. The fourth lens 240 may have negative refractive power. The fourth lens 240 may have a convex object-side surface and a concave image-side surface. Inflection points may be formed on the object-side surface and the image-side surface of the fourth lens 240. The fifth lens 250 may have positive refractive power. The fifth lens 250 may have a convex object-side surface and a convex image-side surface. Inflection points may be formed on the object-side surface and the image-side surface of the fifth lens 250. The sixth lens 260 may have negative refractive power. The sixth lens 260 may have a concave object-side surface and a concave image-side surface. The object-side surface and the image-side surface of the sixth lens 260 may be formed as freeform surfaces.

The optical imaging system 200 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electric signal.

Figure 7:
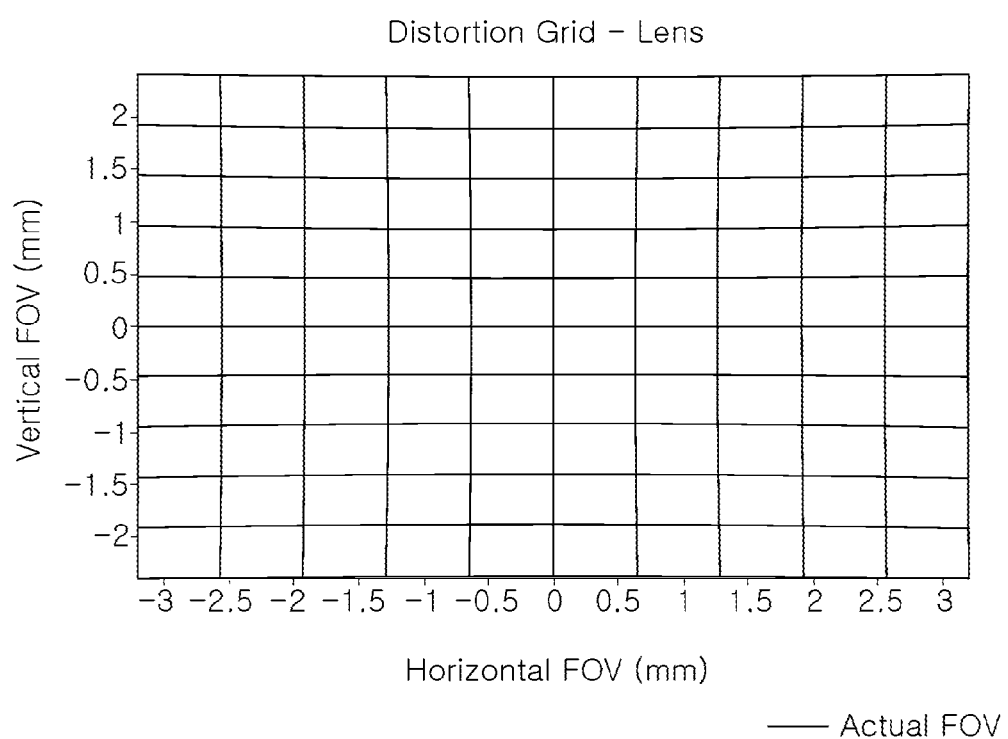
FIG. 7 is a graph illustrating distortion aberrations of the optical imaging system according to the second example.
Figure 8:
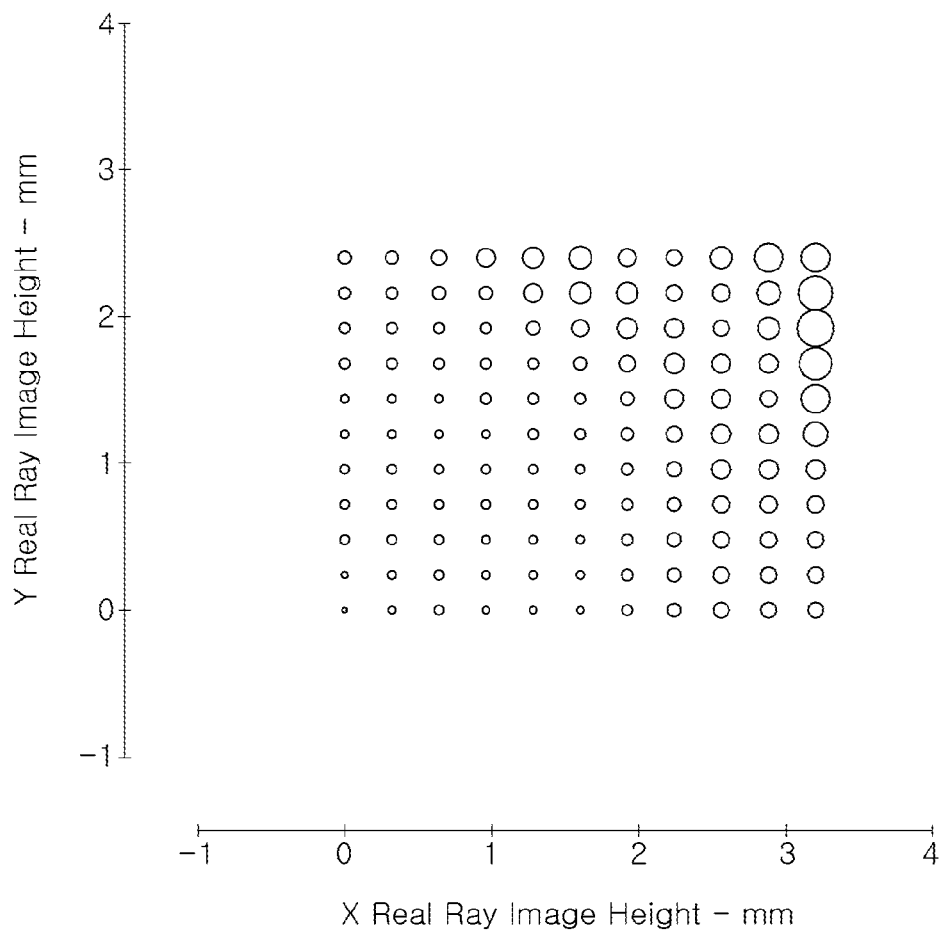
FIG. 8 is a graph illustrating RMS spots of the optical imaging system according to the second example.

Lens characteristics of the optical imaging system 200 according to the second example are listed in Table 4, aspherical values of the optical imaging system 200 according to the second example are listed in Table 5, and $X^n Y^n$ coefficient values of a monomial expression, representing a freeform surface of the optical imaging system 200 according to the second example, are listed in Table 6. FIGS. 7 and 8 are views illustrating aberration curves of the above-configured optical imaging system 200.

TABLE 4

| Surface No. | Note | Radius of Curvature | Thickness/ Distance | Refractive Index | Abbe Number | Effective Radius |
|---|---|---|---|---|---|---|
| S1 | First Lens | 1.649 | 0.665 | 1.546 | 56.114 | 1.200 |
| S2(STOP) | | 4.843 | 0.123 | | | 1.135 |
| S3 | Second Lens | 6.551 | 0.230 | 1.678 | 19.246 | 1.077 |
| S4 | | 3.277 | 0.363 | | | 0.960 |
| S5 | Third Lens | 8.908 | 0.230 | 1.620 | 25.798 | 1.070 |
| S6 | | 14.804 | 0.359 | | | 1.186 |
| S7 | Fourth Lens | 2.609 | 0.230 | 1.678 | 19.246 | 1.740 |
| S8 | | 2.334 | 0.414 | | | 1.957 |
| S9 | Fifth Lens | 30.672 | 0.559 | 1.546 | 56.114 | 2.203 |
| S10 | | −1.723 | 0.576 | | | 2.407 |
| S11 | Sixth Lens | −1.815 | 0.360 | 1.546 | 56.114 | 2.791 |
| S12 | | 5.519 | 0.141 | | | 3.076 |
| S13 | Filter | infinity | 0.210 | 1.518 | 64.166 | 3.762 |
| S14 | | infinity | 0.623 | | | 3.841 |
| S15 | Imaging Plane | infinity | 0.017 | | | |

TABLE 5

| Surface No. | S1 | S2 | S3 | S4 | S5 |
|---|---|---|---|---|---|
| K | −0.98513 | −23.25336 | 21.36453 | 5.85935 | −65.75838 |
| A | 0.00312 | −0.00967 | −0.14734 | −0.12034 | −0.03398 |
| B | 0.18191 | −0.25617 | 0.29791 | 0.50950 | −0.52664 |
| C | −0.68746 | 1.26258 | −0.95981 | −2.26163 | 2.92887 |
| D | 1.63266 | −3.30731 | 3.11155 | 7.75816 | −9.32779 |
| E | −2.44287 | 5.28002 | −6.60736 | −16.88820 | 17.76489 |
| F | 2.31956 | −5.24868 | 8.72524 | 22.98225 | −20.92182 |
| G | −1.35864 | 3.16236 | −6.94053 | −18.95154 | 14.90774 |
| H | 0.44812 | −1.05356 | 3.04836 | 8.67095 | −5.89281 |
| J | −0.06388 | 0.14793 | −0.56858 | −1.68982 | 0.99723 |

| Surface No. | S6 | S7 | S8 | S9 | S10 |
|---|---|---|---|---|---|
| K | −99.00000 | −28.94220 | −20.37693 | 25.26666 | −2.24785 |
| A | −0.12356 | −0.06757 | −0.07652 | −0.02401 | 0.04364 |
| B | 0.09006 | −0.05399 | −0.02736 | −0.03977 | −0.05471 |
| C | −0.06528 | 0.18094 | 0.11658 | 0.09110 | 0.07195 |
| D | −0.14638 | −0.22792 | −0.14182 | −0.08719 | −0.04545 |
| E | 0.16983 | 0.14817 | 0.08990 | 0.04652 | 0.01642 |
| F | 0.13265 | −0.05227 | −0.03170 | −0.01481 | −0.00372 |
| G | −0.34431 | 0.00965 | 0.00617 | 0.00277 | 0.00053 |
| H | 0.22213 | −0.00078 | −0.00060 | −0.00028 | −0.00004 |
| J | −0.04745 | 0.00001 | 0.00002 | 0.00001 | 0.00000 |

TABLE 6

| Note | S11(XY polynomial) | S12(XY polynomial) |
|---|---|---|
| K | −7.092122856 | −5.978745277 |
| $X^4$ | −0.055261014 | −0.041045536 |
| $X^2*Y^2$ | −0.101981088 | −0.074652182 |
| $Y^4$ | −0.052375170 | −0.036929893 |
| $X^6$ | 0.015149263 | 0.006417113 |
| $X^4*Y^2$ | 0.045944628 | 0.019576697 |
| $X^2*Y^4$ | 0.045253987 | 0.019645599 |
| $Y^6$ | 0.015159142 | 0.005890101 |
| $X^8$ | −0.001429364 | −0.000843248 |
| $X^6*Y^2$ | −0.006052558 | −0.003237262 |
| $X^4*Y^4$ | −0.009244802 | −0.005174942 |
| $X^2*Y^6$ | −0.006226979 | −0.003238344 |
| $Y^8$ | −0.001478159 | −0.000749957 |
| $X^{10}$ | 0.000046198 | 0.000042239 |
| $X^8*Y^2$ | 0.000240185 | 0.000188891 |
| $X^6*Y^4$ | 0.000535256 | 0.000417617 |
| $X^4*Y^6$ | 0.000547717 | 0.000412417 |
| $X^2*Y^8$ | 0.000303318 | 0.000183268 |
| $Y^{10}$ | 0.000046096 | 0.000041428 |

Figure 9:
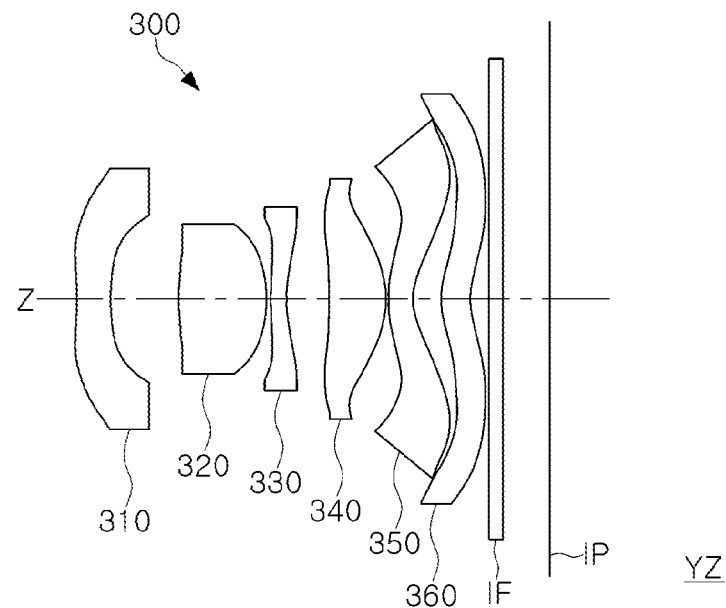
FIG. 9 is a side view of an optical imaging system according to a third example in a Y-Z direction.
Figure 10:
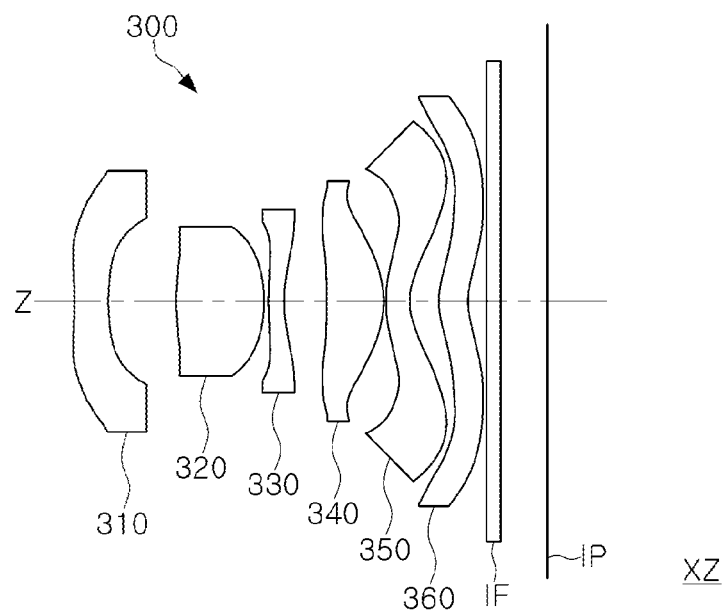
FIG. 10 is a side view of the optical imaging system according to the third example in an X-Z direction.

Hereinafter, an optical imaging system 300 according to a third example will be described with reference to FIGS. 9 and 10. FIG. 9 illustrates the optical imaging system 300 in a Y-Z direction, and FIG. 10 illustrates the optical imaging system 300 in an X-Z direction.

The optical system 300 may include a first lens 310, a second lens 320, a third lens 330, a fourth lens 340, a fifth lens 350, and a sixth lens 360.

The first lens 310 may have negative refractive power. The first lens 310 may have a concave object-side surface and a concave image-side surface. An inflection point is formed on the object-side surface of the first lens 310. The second lens 320 may have positive refractive power. The second lens 320 may have a convex object-side surface and a convex image-side surface. The third lens 330 may have negative refractive power. The third lens 330 may have a convex object-side surface and a concave image-side surface. Inflection points may be formed on the object-side surface and the image-side surface of the third lens 330. The fourth lens 340 may have positive refractive power. The fourth lens 340 may have a concave object-side surface and a convex image-side surface. Inflection points may be formed on the object-side surface and the image-side surface of the fourth lens 340. The fifth lens 350 may have negative refractive power. The fifth lens 350 may have a convex object-side surface and a concave image-side surface. The object-side surface and the image-side surface of the fifth lens 350 may be formed as freeform surfaces. The sixth lens 360 may have positive refractive power. The sixth lens 360 may have a convex object-side surface and a concave image-side surface. Inflection points may be formed on the object-side surface and the image-side surface of the sixth lens 360.

The optical imaging system 300 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electric signal.

Figure 11:
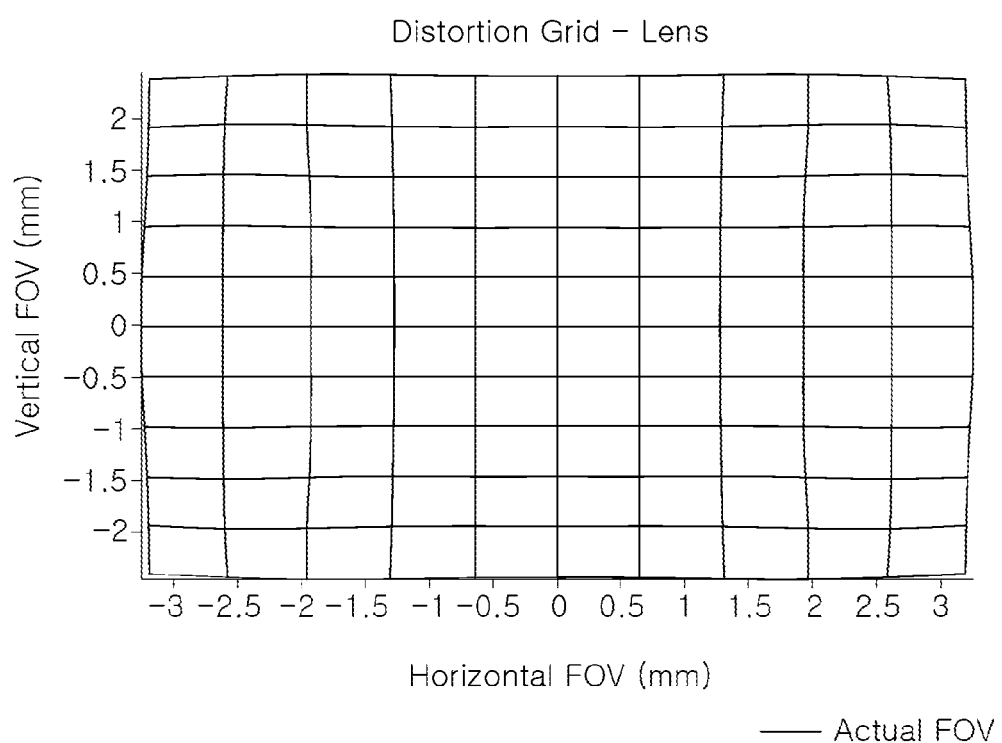
FIG. 11 is a graph illustrating distortion aberrations of the optical imaging system according to the third example.
Figure 12:
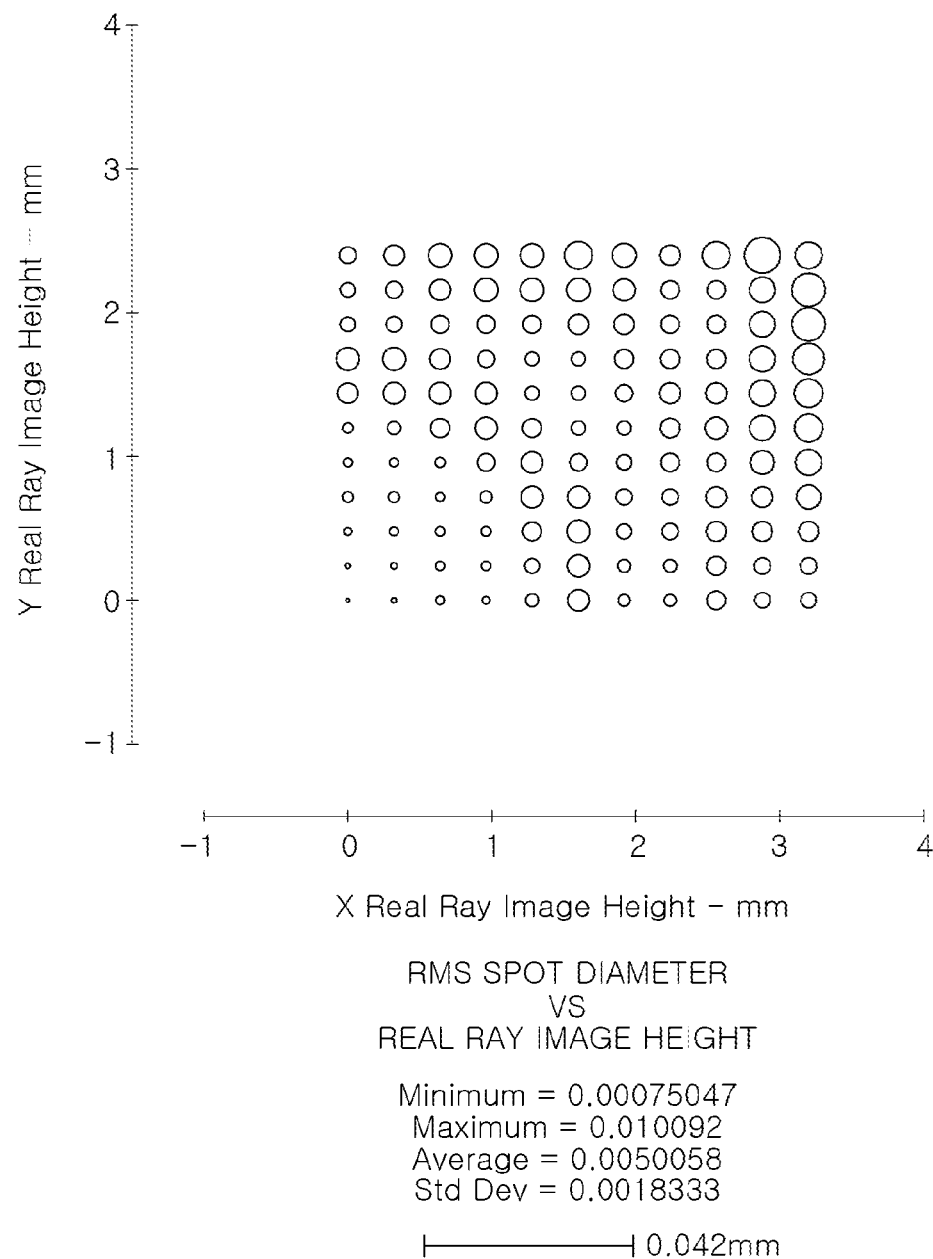
FIG. 12 is a graph illustrating RMS spots of the optical imaging system according to the third example.

Lens characteristics of the optical imaging system 300 according to the third example are listed in Table 7, aspherical values of the optical imaging system 300 according to the third example are listed in Table 8, and X″Y″ coefficient values of a monomial expression, representing a freeform surface of the optical imaging system 300 according to the third example, are listed in Table 9. FIGS. 11 and 12 are views illustrating aberration curves of the above-configured optical imaging system 300.

TABLE 7

| Surface No. | Note | Radius of Curvature | Thickness/ Distance | Refractive Index | Abbe Number | Effective Radius |
|---|---|---|---|---|---|---|
| S1 | First Lens | −9.243 | 0.509 | 1.546 | 55.990 | 1.927 |
| S2 | | 5.076 | 1.003 | | | 1.245 |
| S3(STOP) | Second Lens | 4.279 | 1.298 | 1.546 | 55.990 | 0.710 |
| S4 | | −1.811 | 0.050 | | | 1.107 |
| S5 | Third Lens | 3.738 | 0.250 | 1.677 | 19.238 | 1.198 |
| S6 | | 2.145 | 0.610 | | | 1.360 |
| S7 | Fourth Lens | −7.319 | 0.850 | 1.546 | 55.990 | 1.682 |
| S8 | | −1.374 | 0.025 | | | 1.779 |
| S9 | Fifth Lens | 1.648 | 0.362 | 1.640 | 23.959 | 1.960 |
| S10 | | 0.858 | 0.427 | | | 2.660 |
| S11 | Sixth Lens | 1.453 | 0.425 | 1.644 | 23.491 | 2.796 |
| S12 | | 1.444 | 0.268 | | | 3.032 |
| S13 | Filter | infinity | 0.210 | 1.518 | 64.166 | 3.464 |
| S14 | | infinity | 0.683 | | | 3.557 |
| S15 | Imaging Plane | infinity | 0.007 | | | |

TABLE 8

| Surface No. | S1 | S2 | S3 | S4 | S5 |
|---|---|---|---|---|---|
| K | −96.71006 | 8.52327 | −20.65867 | −0.54377 | −39.99832 |
| A | 0.10858 | 0.16381 | 0.00412 | −0.17544 | −0.19858 |
| B | −0.04792 | 0.00423 | 0.20155 | 0.73027 | 0.65882 |
| C | 0.01549 | −0.04065 | −2.73943 | −2.54543 | −2.18393 |
| D | 0.00186 | −0.16541 | 17.57854 | 5.69641 | 4.51129 |
| E | −0.00459 | 0.70619 | −69.56375 | −8.39970 | −6.04043 |
| F | 0.00219 | −1.05562 | 171.48476 | 8.04760 | 5.22882 |
| G | −0.00053 | 0.81214 | −256.88110 | −4.82475 | −2.81993 |
| H | 0.00006 | −0.31963 | 213.74706 | 1.64042 | 0.85939 |
| J | 0.00000 | 0.05036 | −75.75077 | −0.24108 | −0.11264 |

| Surface No. | S6 | S7 | S8 | S11 | S12 |
|---|---|---|---|---|---|
| K | −2.69264 | −73.32304 | −1.46752 | −2.08268 | −1.01990 |
| A | −0.16825 | −0.04999 | 0.04568 | −0.17581 | −0.23272 |
| B | 0.32612 | 0.09669 | 0.03007 | 0.02195 | 0.08944 |
| C | −0.73365 | −0.08558 | −0.13882 | 0.04566 | −0.02016 |
| D | 1.14623 | 0.05443 | 0.18601 | −0.03087 | 0.00219 |
| E | −1.18185 | −0.02321 | −0.13774 | 0.00944 | 0.00000 |
| F | 0.78995 | 0.00675 | 0.06339 | −0.00164 | −0.00002 |
| G | −0.32889 | −0.00138 | −0.01759 | 0.00017 | 0.00000 |
| H | 0.07741 | 0.00019 | 0.00266 | −0.00001 | 0.00000 |
| J | −0.00785 | −0.00001 | −0.00017 | 0.00000 | 0.00000 |

TABLE 9

| Note | S9(XY polynomial) | S10(XY polynomial) |
|---|---|---|
| K | −12.504876240 | −3.829676063 |
| $X^4$ | 0.027658126 | −0.032626007 |
| $X^2*Y^2$ | 0.052044182 | −0.071540171 |
| $Y^4$ | 0.027567041 | −0.029643208 |
| $X^6$ | −0.052271480 | 0.004142788 |
| $X^4*Y^2$ | −0.161078095 | 0.012336863 |
| $X^2*Y^4$ | −0.154214726 | 0.016086852 |
| $Y^6$ | −0.049972645 | 0.002049829 |
| $X^8$ | 0.013595827 | −0.000776936 |
| $X^6*Y^2$ | 0.054637845 | −0.003328583 |
| $X^4*Y^4$ | 0.090605903 | −0.003014297 |
| $X^2*Y^6$ | 0.048497807 | −0.005221393 |
| $Y^8$ | 0.011341120 | −0.000368805 |
| $X^{10}$ | −0.001372596 | 0.000048213 |
| $X^8*Y^2$ | −0.006516565 | 0.000306153 |
| $X^6*Y^4$ | −0.014909373 | 0.000309113 |
| $X^4*Y^6$ | −0.015142866 | 0.000412827 |
| $X^2*Y^8$ | −0.004868184 | 0.000541012 |
| $Y^{10}$ | −0.000820448 | 0.000038001 |

Figure 13:
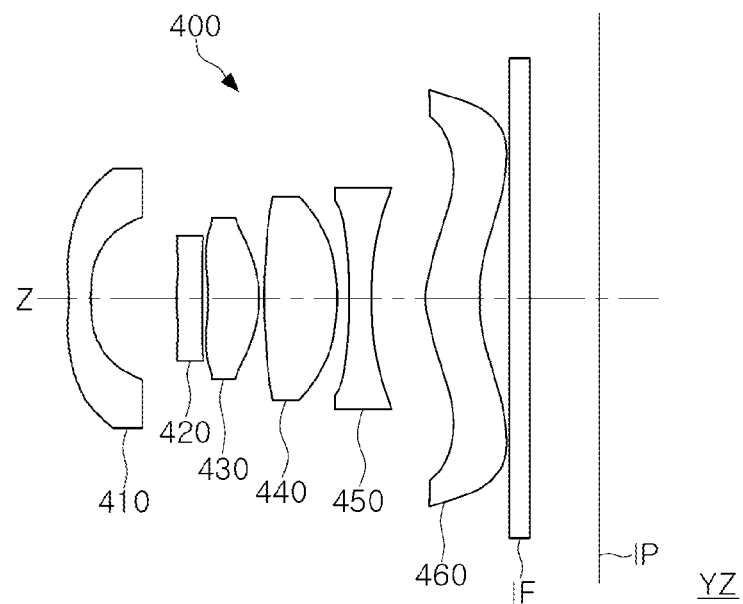
FIG. 13 is a side view of an optical imaging system according to a fourth example in a Y-Z direction.
Figure 14:
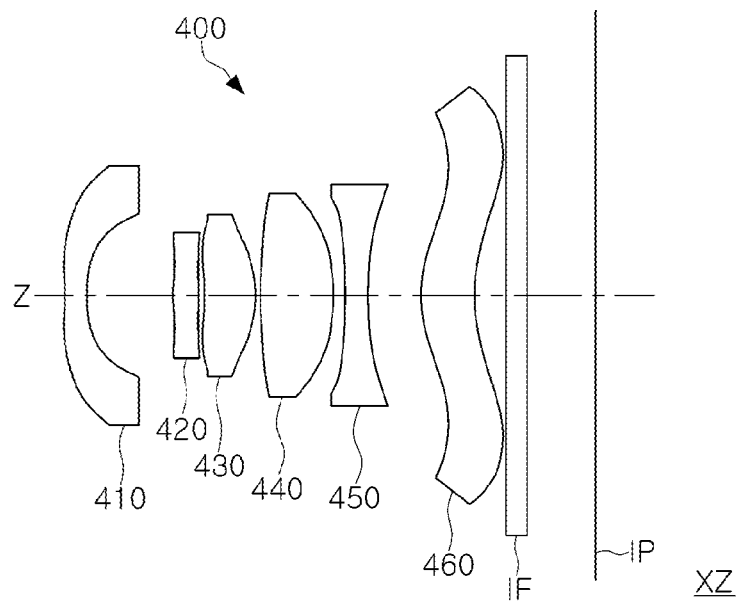
FIG. 14 is a side view of the optical imaging system according to the fourth example in an X-Z direction.

Hereinafter, an optical imaging system 400 according to a fourth example will be described with reference to FIGS. 13 and 14. FIG. 13 illustrates the optical imaging system 400 in a Y-Z direction, and FIG. 14 illustrates the optical imaging system 400 in an X-Z direction.

The imaging optical system 400 may include a first lens 410, a second lens 420, a third lens 430, a fourth lens 440, a fifth lens 450, and a sixth lens 460.

The first lens 410 may have negative refractive power. The first lens 410 may have a concave object-side surface and a concave image-side surface. An inflection point may be formed on the object-side surface of the first lens 410. The second lens 420 may have positive refractive power. The second lens 420 may have a convex object-side surface and a concave image-side surface. The third lens 430 may have positive refractive power. The third lens 430 may have a concave object-side surface and a convex image-side surface. An inflection point may be formed on the object-side surface of the third lens 430. The fourth lens 440 may have positive refractive power. The fourth lens 440 may have a convex object-side surface and a convex image-side surface. The fifth lens 450 may have negative refractive power. The fifth lens 450 may have a concave object-side surface and a concave image-side surface. The sixth lens 460 may have positive refractive power. The sixth lens 460 may have a convex object-side surface and a concave image-side surface. The object-side surface and the image-side surface of the sixth lens 460 may be formed as freeform surfaces.

The optical imaging system 400 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electric signal.

Figure 15:
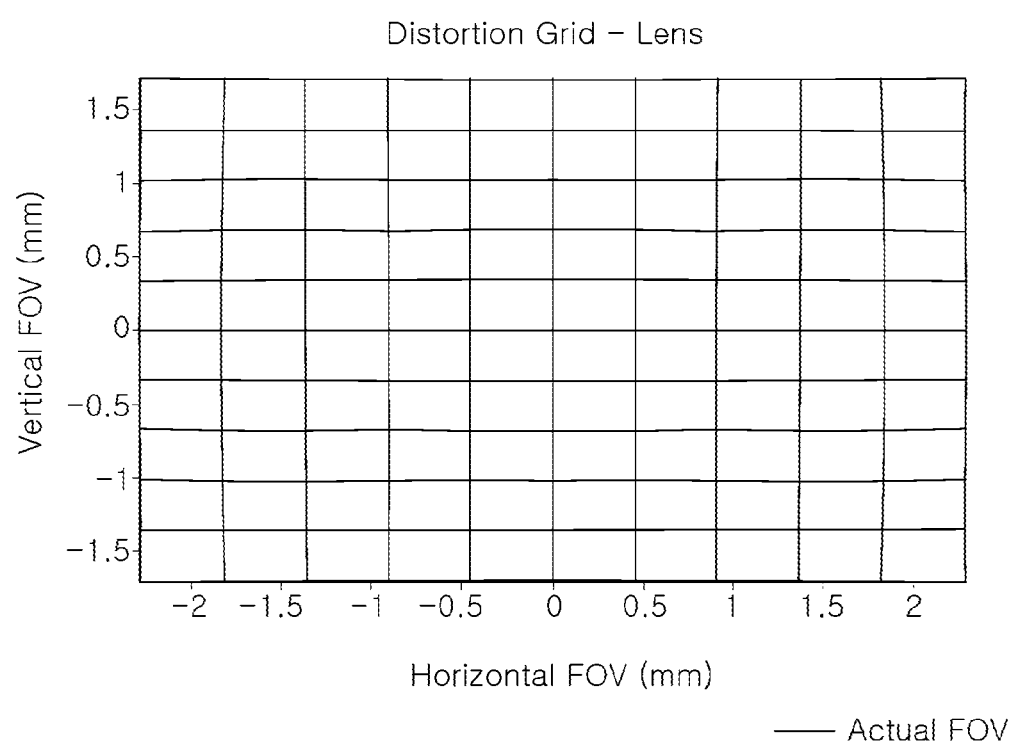
FIG. 15 is a graph illustrating distortion aberrations of the optical imaging system according to the fourth example.
Figure 16:
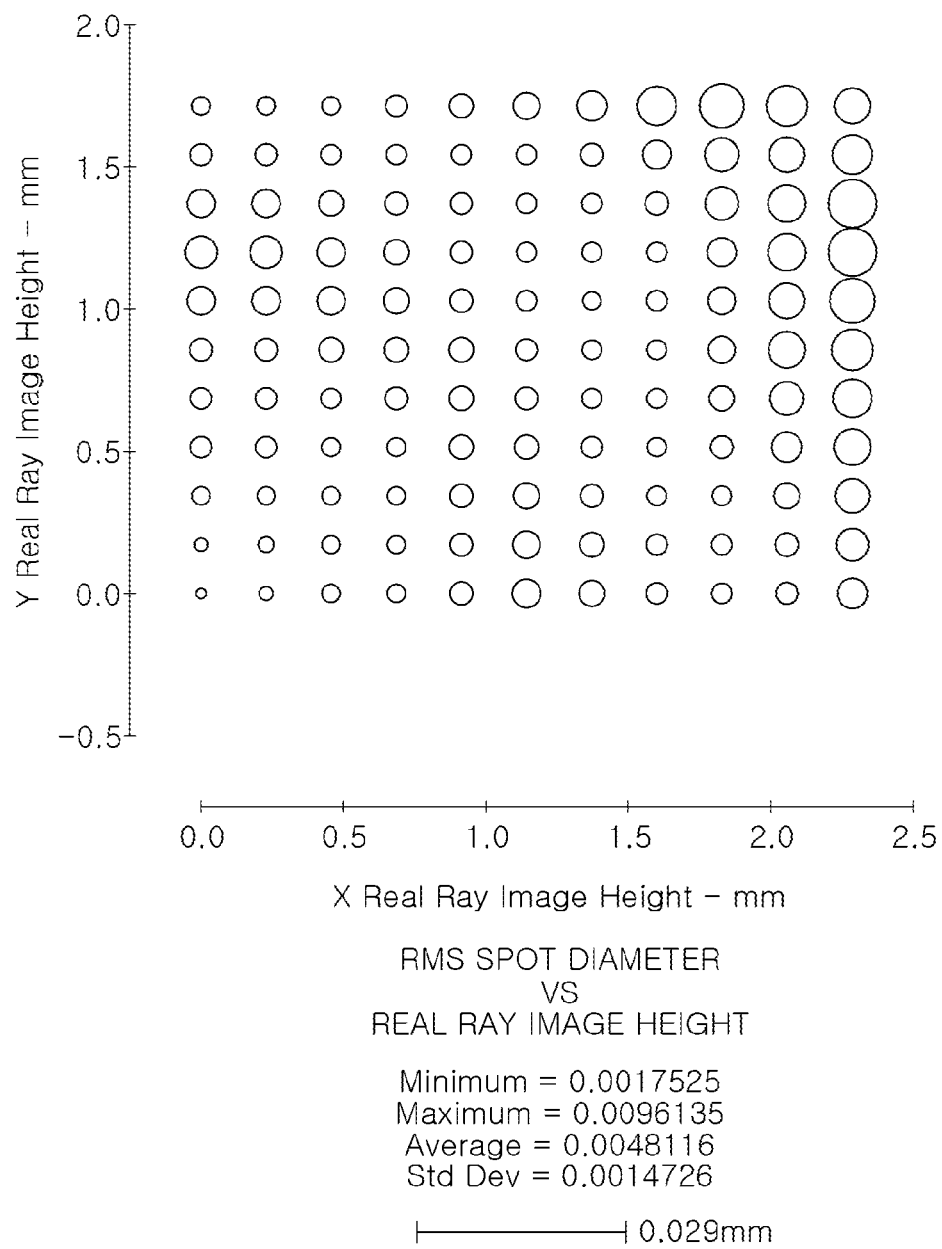
FIG. 16 is a graph illustrating RMS spots of the optical imaging system according to the fourth example.

Lens characteristics of the optical imaging system 400 according to the fourth example are listed in Table 10, aspherical values of the optical imaging system 400 according to the fourth example are listed in Table 11, and $X''Y''$ coefficient values of a monomial expression, representing a freeform surface of the optical imaging system 400 according to the fourth example, are listed in Table 12. FIGS. 15 and 16 are views illustrating aberration curves of the above-configured optical imaging system 400.

TABLE 10

| Surface No. | Note | Radius of Curvature | Thickness/Distance | Refractive Index | Abbe Number | Effective Radius |
|---|---|---|---|---|---|---|
| S1 | First Lens | −4.872 | 0.230 | 1.546 | 55.990 | 1.315 |
| S2 | | 1.986 | 0.857 | | | 0.820 |
| S3(STOP) | Second Lens | 5.016 | 0.257 | 1.656 | 21.536 | 0.500 |
| S4 | | 33.124 | 0.050 | | | 0.639 |
| S5 | Third Lens | −3.233 | 0.518 | 1.546 | 55.990 | 0.710 |
| S6 | | −1.309 | 0.050 | | | 0.820 |
| S7 | Fourth Lens | 3.929 | 0.731 | 1.546 | 55.990 | 1.004 |
| S8 | | −2.203 | 0.115 | | | 1.051 |
| S9 | Fifth Lens | −13.591 | 0.230 | 1.677 | 19.238 | 1.028 |
| S10 | | 3.008 | 0.546 | | | 1.213 |
| S11 | Sixth Lens | 1.200 | 0.538 | 1.546 | 55.990 | 1.965 |
| S12 | | 1.715 | 0.299 | | | 2.169 |
| S13 | Filter | infinity | 0.210 | 1.518 | 64.166 | 2.456 |
| S14 | | infinity | 0.670 | | | 2.531 |
| S15 | Imaging Plane | infinity | 0.020 | | | |

TABLE 11

| Surface No. | S1 | S2 | S3 | S4 | S5 |
|---|---|---|---|---|---|
| K | 10.77525 | 0.34027 | −45.58592 | −99.00000 | −99.00000 |
| A | 0.68762 | 0.75667 | −0.15219 | −0.06033 | −0.17647 |
| B | −1.00024 | −0.43830 | −1.65386 | 1.39728 | 3.75727 |
| C | 1.11575 | 7.37345 | 14.86402 | −14.52525 | −29.20950 |
| D | −0.68563 | −80.47275 | −116.98965 | 113.43240 | 207.92111 |
| E | 0.02420 | 401.59359 | 599.68773 | −511.84949 | −911.04749 |
| F | 0.31290 | −1100.63255 | −1994.22257 | 1311.40562 | 2327.12719 |
| G | −0.23884 | 1733.79764 | 3986.02785 | −1973.70303 | −3452.38248 |
| H | 0.07758 | −1477.42307 | −4037.08918 | 1707.43924 | 2782.03821 |
| J | −0.00956 | 530.45287 | 1359.15586 | −688.01032 | −947.50452 |

| Surface No. | S6 | S7 | S8 | S9 | S10 |
|---|---|---|---|---|---|
| K | 0.15209 | −18.90956 | 2.99636 | 98.97285 | −0.83259 |
| A | −0.04275 | −0.08843 | −0.06148 | −0.34839 | −0.32761 |
| B | −0.00550 | 0.08249 | −0.61209 | 1.54597 | 1.17675 |
| C | 0.90729 | 0.31408 | 3.65520 | −4.76873 | −1.91106 |
| D | 3.50419 | −1.23134 | −11.30148 | 10.99266 | 1.83405 |
| E | −44.08067 | 0.78508 | 22.05262 | −18.52866 | −1.16185 |
| F | 159.61176 | 2.97103 | −28.16881 | 20.42944 | 0.52228 |
| G | −279.00346 | −6.40154 | 23.05346 | −13.55974 | −0.17130 |
| H | 243.25479 | 4.90044 | −10.94430 | 4.83455 | 0.03710 |
| J | −85.35839 | −1.35298 | 2.29068 | −0.70042 | −0.00379 |

TABLE 12

| Note | S11(XY polynomial) | S12(XY polynomial) |
|---|---|---|
| K | −5.101046611 | −0.778103584 |
| $X^4$ | −0.007191785 | −0.087879986 |
| $X^2*Y^2$ | −0.023028088 | −0.193072970 |
| $Y^4$ | −0.015467065 | −0.095280080 |
| $X^6$ | −0.044660471 | 0.002068302 |
| $X^4*Y^2$ | −0.129039145 | 0.013960366 |
| $X^2*Y^4$ | −0.115493560 | 0.031801290 |
| $Y^6$ | −0.042160221 | 0.000138924 |
| $X^8$ | 0.014672456 | 0.001211059 |
| $X^6*Y^2$ | 0.052944107 | 0.000176623 |
| $X^4*Y^4$ | 0.084353015 | 0.004542385 |
| $X^2*Y^6$ | 0.044311011 | −0.011236068 |
| $Y^8$ | 0.017256098 | 0.005092219 |
| $X^{10}$ | −0.001405193 | −0.000238697 |
| $X^8*Y^2$ | −0.005589947 | −0.000406415 |
| $X^6*Y^4$ | −0.012326488 | −0.002244343 |
| $X^4*Y^6$ | −0.012099894 | −0.000960046 |
| $X^2*Y^8$ | −0.003862482 | 0.001869968 |
| $Y^{10}$ | −0.002443115 | −0.001213091 |

Figure 17:
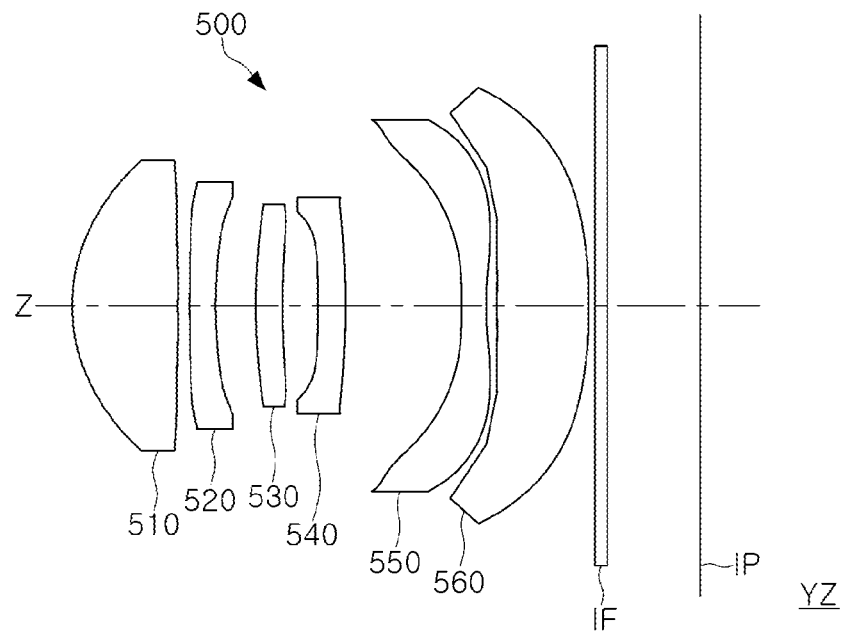
FIG. 17 is a side view of an optical imaging system according to a fifth example in a Y-Z direction.
Figure 18:
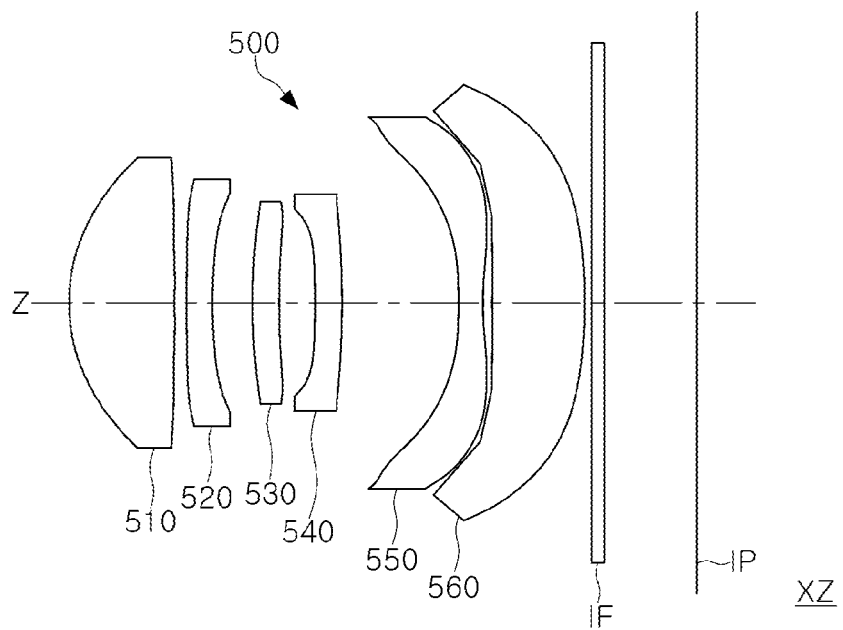
FIG. 18 is a side view of the optical imaging system according to the fifth example in an X-Z direction.

Hereinafter, an optical imaging system 500 according to a fifth example will be described with reference to FIGS. 17 and 18. FIG. 17 illustrates the optical imaging system 500 in a Y-Z direction, and FIG. 18 illustrates the optical imaging system 500 in an X-Z direction.

The optical system 500 may include a first lens 510, a second lens 520, a third lens 530, a fourth lens 540, a fifth lens 550, and a sixth lens 560.

The first lens 510 may have positive refractive power. The first lens 510 may have a convex object-side surface and a convex image-side surface. The second lens 520 may have negative refractive power. The second lens 520 may have a convex object-side surface and a concave image-side surface. The third lens 530 may have negative refractive power. The third lens 530 may have a convex object-side surface and a concave image-side surface. The fourth lens 540 may have negative refractive power. The fourth lens 540 may have a concave object-side surface and a concave image-side surface. The fifth lens 550 may have negative refractive power. The fifth lens 550 may have a concave object-side surface and a concave image-side surface. Inflection points may be formed on the object-side surface and the image-side surface of the fifth lens 550. The sixth lens 560 may have positive refractive power. The sixth lens 560 may have a convex object-side surface and a convex image-side surface. The object-side surface and the image-side surface of the sixth lens 560 may be formed as freeform surfaces.

The optical imaging system 500 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electric signal.

Figure 19:
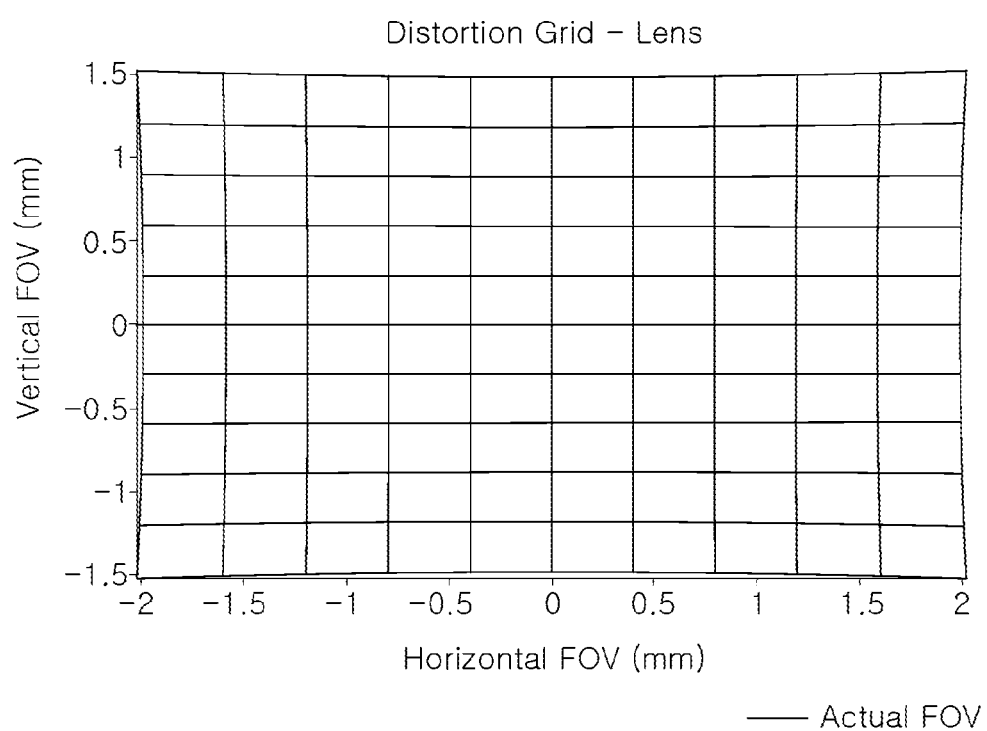
FIG. 19 is a graph illustrating distortion aberrations of the optical imaging system according to the fifth example.
Figure 20:
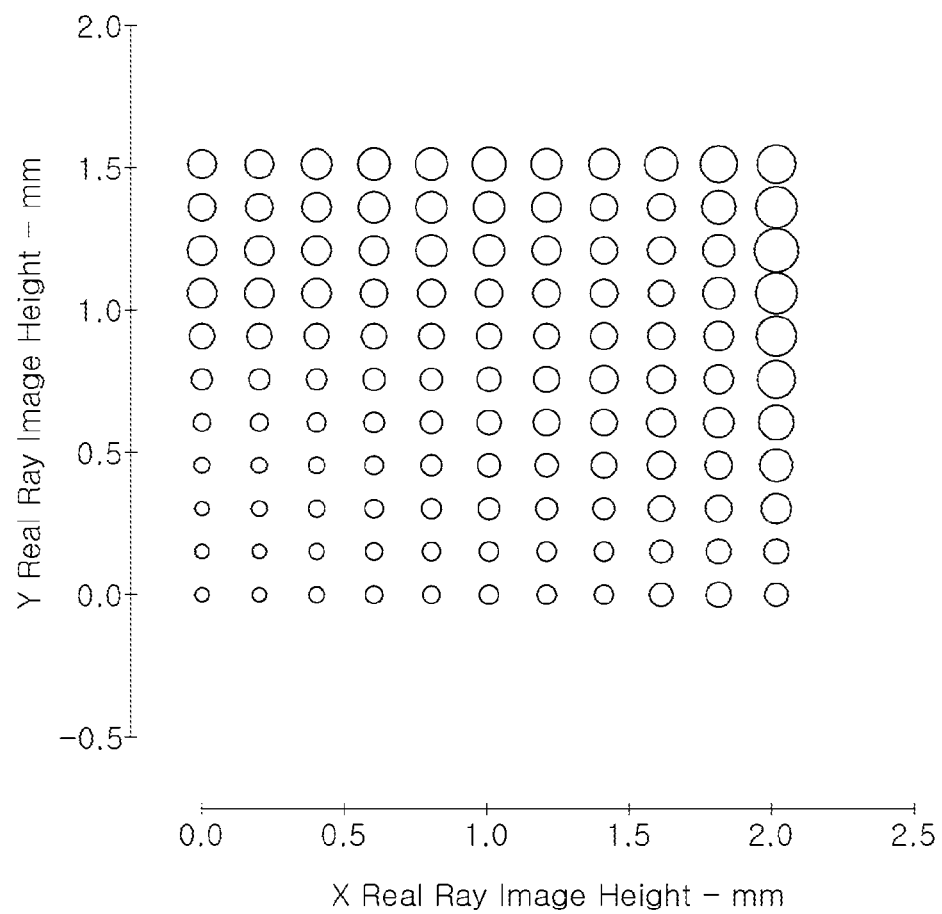
FIG. 20 is a graph illustrating RMS spots of the optical imaging system according to the fifth example.

Lens characteristics of the optical imaging system 500 according to the fifth example are listed in Table 13, aspherical values of the optical imaging system 500 according to the fifth example are listed in Table 14, and X"Y" coefficient values of a monomial expression, representing a freeform surface of the optical imaging system 500 according to the fifth example, are listed in Table 15. FIGS. 19 and 20 are views illustrating aberration curves of the above-configured optical imaging system 500.

TABLE 13

| Surface No. | Note | Radius of Curvature | Thickness/ Distance | Refractive Index | Abbe Number | Effective Radius |
|---|---|---|---|---|---|---|
| S1 | First Lens | 1.530 | 0.903 | 1.546 | 55.990 | 1.260 |
| S2 | | −19.068 | 0.111 | | | 1.168 |
| S3(STOP) | Second Lens | 32.852 | 0.220 | 1.668 | 20.377 | 1.067 |
| S4 | | 3.681 | 0.361 | | | 0.950 |
| S5 | Third Lens | 38.864 | 0.220 | 1.546 | 55.990 | 0.875 |
| S6 | | 8.816 | 0.306 | | | 0.820 |
| S7 | Fourth Lens | −22.071 | 0.220 | 1.641 | 23.959 | 0.822 |
| S8 | | 10.294 | 1.015 | | | 0.961 |
| S9 | Fifth Lens | −6.529 | 0.220 | 1.546 | 55.990 | 1.400 |
| S10 | | 3.187 | 0.086 | | | 1.646 |
| S11 | Sixth Lens | 20.830 | 0.798 | 1.657 | 21.536 | 1.720 |
| S12 | | −5.878 | 0.050 | | | 1.933 |
| S13 | Filter | infinity | 0.110 | 1.519 | 64.197 | 2.373 |
| S14 | | infinity | 0.780 | | | 2.400 |
| S15 | Imaging Plane | infinity | 0.010 | | | |

TABLE 14

| Surface No. | S1 | S2 | S3 | S4 | S5 |
|---|---|---|---|---|---|
| K | −0.14153 | 0.00000 | 9.00201 | 3.33433 | 99.00000 |
| A | −0.01000 | −0.00286 | −0.06864 | −0.10628 | −0.08136 |
| B | 0.05946 | 0.09339 | 0.29637 | 0.33583 | 0.79471 |
| C | −0.24523 | −0.08347 | −0.08502 | −0.07341 | −3.04670 |
| D | 0.57313 | −0.21002 | −1.29325 | −1.36767 | 11.26266 |
| E | −0.83226 | 0.68025 | 3.68997 | 3.83960 | −30.60010 |
| F | 0.75002 | −0.89139 | −5.20167 | −5.41806 | 53.29985 |
| G | −0.40771 | 0.62344 | 4.12732 | 3.95999 | −57.44265 |
| H | 0.12160 | −0.22575 | −1.73076 | −1.10986 | 35.60311 |
| J | −0.01527 | 0.03318 | 0.29674 | −0.03420 | −9.73514 |

| Surface No. | S6 | S7 | S8 | S9 | S10 |
|---|---|---|---|---|---|
| K | 72.21799 | 98.76403 | 0.00000 | 15.35503 | −50.97515 |
| A | −0.14240 | −0.34525 | −0.25027 | −0.31832 | −0.12118 |
| B | 1.04699 | −0.45482 | 0.15293 | 0.25489 | 0.00882 |
| C | −6.56578 | 5.46841 | 0.37303 | 0.05655 | 0.07284 |
| D | 33.86044 | −28.04469 | −1.52775 | −0.63256 | −0.14523 |
| E | −116.05448 | 83.99201 | 2.95954 | 1.01153 | 0.13496 |
| F | 246.40731 | −154.94584 | −3.80452 | −0.83204 | −0.07095 |
| G | −316.96444 | 165.96028 | 3.64199 | 0.38087 | 0.02165 |
| H | 227.39595 | −89.71745 | −2.09454 | −0.09105 | −0.00361 |
| J | −69.85628 | 16.79435 | 0.48252 | 0.00883 | 0.00025 |

TABLE 15

| Note | S11(XY polynomial) | S12(XY polynomial) |
|---|---|---|
| K | −99.000000000 | 0.000000000 |
| $X^4$ | −0.030651360 | −0.052860916 |
| $X^2*Y^2$ | −0.066416848 | −0.117220388 |
| $Y^4$ | −0.031830363 | −0.056745558 |
| $X^6$ | −0.033533538 | 0.008192482 |
| $X^4*Y^2$ | −0.087836279 | 0.033297322 |
| $X^2*Y^4$ | −0.089936683 | 0.041968636 |
| $Y^6$ | −0.035347021 | 0.005390557 |
| $X^8$ | 0.009695577 | −0.002933583 |
| $X^6*Y^2$ | 0.036639387 | −0.011448509 |
| $X^4*Y^4$ | 0.055223274 | −0.019860374 |
| $X^2*Y^6$ | 0.041299779 | −0.017165767 |
| $Y^8$ | 0.013784333 | 0.000643736 |
| $X^{10}$ | −0.001077407 | 0.000089118 |
| $X^8*Y^2$ | −0.004556904 | 0.000420634 |
| $X^6*Y^4$ | −0.014091356 | −0.000664588 |
| $X^4*Y^6$ | −0.008549258 | 0.002625313 |
| $X^2*Y^8$ | −0.006516538 | 0.001533918 |
| $Y^{10}$ | −0.001670349 | −0.000457847 |

Figure 21:
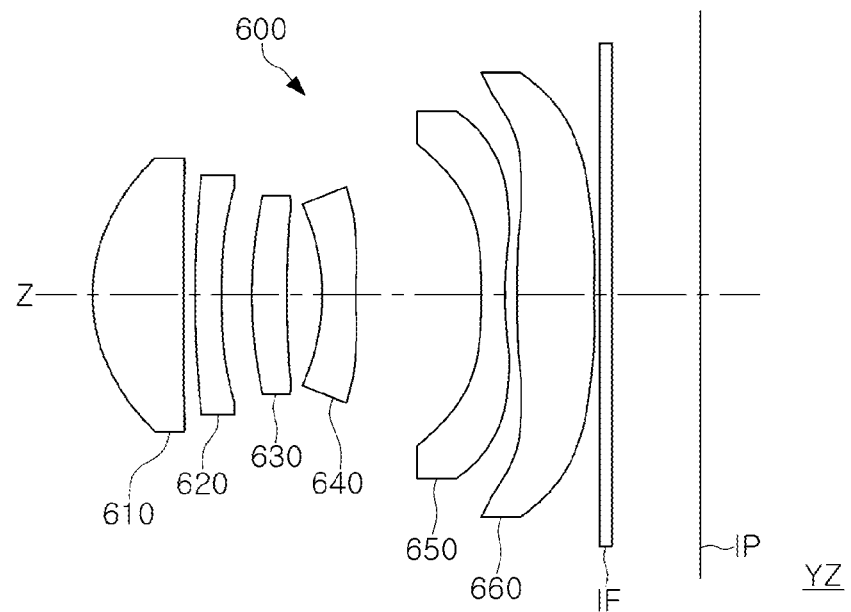
FIG. 21 is a side view of an optical imaging system according to a sixth example in a Y-Z direction.
Figure 22:
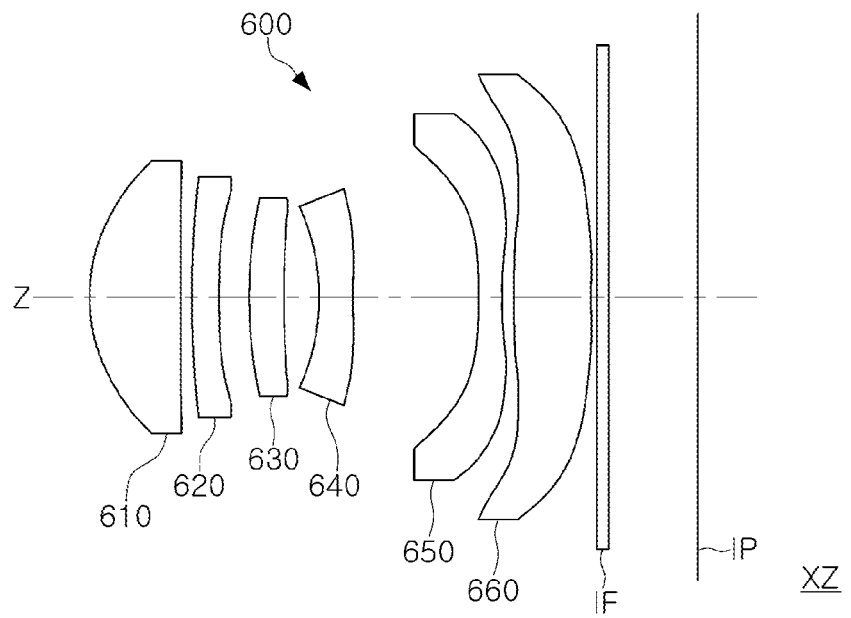
FIG. 22 is a side view of the optical imaging system according to the sixth example in an X-Z direction.

Hereinafter, an optical imaging system 600 according to a sixth example will be described with reference to FIGS. 21 and 22. FIG. 21 illustrates the optical imaging system 600 in a Y-Z direction, and FIG. 22 illustrates the optical imaging system 600 in an X-Z direction.

The optical system 600 may include a first lens 610, a second lens 620, a third lens 630, a fourth lens 640, a fifth lens 650, and a sixth lens 660.

The first lens 610 may have positive refractive power. The first lens 610 may have a convex object-side surface and a convex image-side surface. The second lens 620 may have negative refractive power. The second lens 620 may have a concave object-side surface and a concave image-side surface. The third lens 630 may have negative refractive power. The third lens 630 may have a convex object-side surface and a concave image-side surface. The fourth lens 640 may have negative refractive power. The fourth lens 640 may have a concave object-side surface and a concave image-side surface. The object-side surface and the image-side surface of the fourth lens 640 may be formed as freeform surfaces. The fifth lens 650 may have negative refractive power. The fifth lens 650 may have a concave object-side surface and a concave image-side surface. Inflection points may be formed on the object-side surface and the image-side surface of the fifth lens 650. The sixth lens 660 may have positive refractive power. The sixth lens 660 may have a convex object-side surface and a convex image-side surface. An inflection point may be formed on the object-side surface of the sixth lens 660.

The optical imaging system 600 may further include a filter IF and an image sensor IP.

The filter IF may be disposed in front of the image sensor IP to block infrared rays, and the like, included in incident light. The image sensor IP may include a plurality of optical sensors. The image sensor IP may be configured to convert an optical signal into an electric signal.

Figure 23:
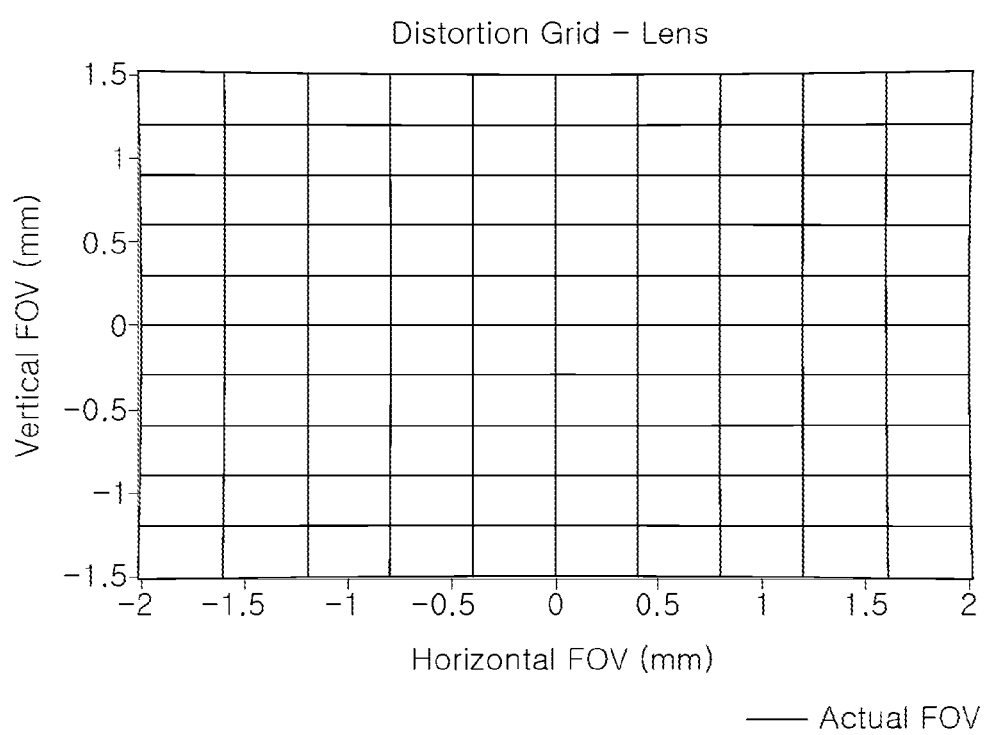
FIG. 23 is a graph illustrating distortion aberrations of the optical imaging system according to the sixth example.
Figure 24:
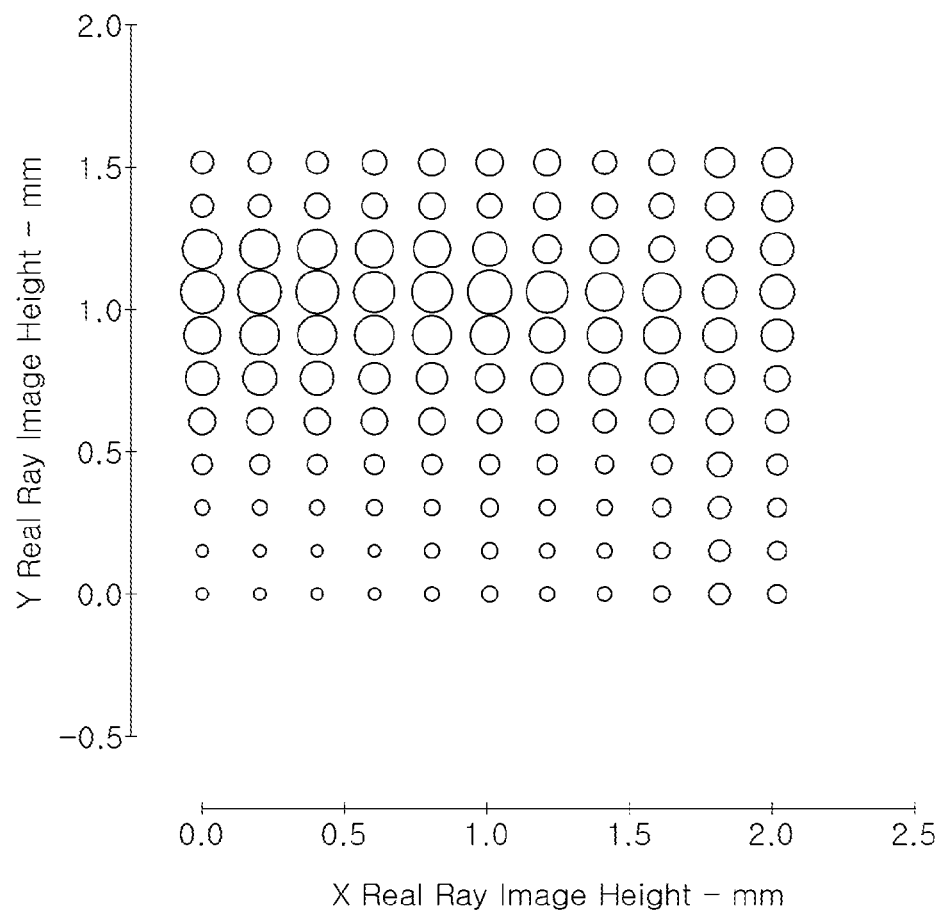
FIG. 24 is a graph illustrating RMS spots of the optical imaging system according to the sixth example.

Lens characteristics of the optical imaging system 600 according to the sixth example are listed in Table 16, aspherical values of the optical imaging system 600 according to the sixth example are listed in Table 17, and X"Y" coefficient values of a monomial expression, representing a freeform surface of the optical imaging system 600 according to the sixth example, are listed in Table 18. FIGS. 23 and 24 are views illustrating aberration curves of the above-configured optical imaging system 600.

TABLE 16

| Surface No. | Note | Radius of Curvature | Thickness/ Distance | Refractive Index | Abbe Number | Effective Radius |
|---|---|---|---|---|---|---|
| S1 | First Lens | 1.539 | 0.812 | 1.546 | 55.990 | 1.220 |
| S2 | | −41.226 | 0.113 | | | 1.141 |
| S3(STOP) | Second Lens | −78.034 | 0.224 | 1.668 | 20.377 | 1.071 |
| S4 | | 4.927 | 0.300 | | | 0.962 |
| S5 | Third Lens | 33.827 | 0.285 | 1.546 | 55.990 | 0.892 |
| S6 | | 8.757 | 0.311 | | | 0.810 |
| S7 | Fourth Lens | −47.870 | 0.301 | 1.641 | 23.959 | 0.825 |
| S8 | | 10.718 | 1.108 | | | 1.014 |
| S9 | Fifth Lens | −6.484 | 0.220 | 1.546 | 55.990 | 1.457 |
| S10 | | 5.403 | 0.102 | | | 1.736 |
| S11 | Sixth Lens | 10.322 | 0.685 | 1.657 | 21.536 | 1.969 |
| S12 | | −44.449 | 0.050 | | | 2.092 |
| S13 | Filter | Infinity | 0.110 | 1.519 | 64.197 | 2.382 |
| S14 | | infinity | 0.780 | | | 2.407 |
| S15 | Imaging Plane | infinity | 0.010 | | | |

TABLE 17

| Surface No. | S1 | S2 | S3 | S4 | S5 |
|---|---|---|---|---|---|
| K | −0.1347 | 0.0000 | 99.0000 | 3.1526 | 99.0000 |
| A | −0.0059 | −0.0031 | −0.0717 | −0.1205 | −0.0729 |
| B | 0.0401 | 0.0746 | 0.3270 | 0.4755 | 0.6005 |
| C | −0.1600 | −0.0760 | −0.3278 | −0.7777 | −1.6925 |
| D | 0.3421 | 0.0656 | −0.1116 | 1.0253 | 5.1610 |
| E | −0.4398 | −0.2281 | 0.5187 | −1.6165 | −13.7498 |
| F | 0.3350 | 0.4462 | −0.3655 | 2.3001 | 25.0648 |
| G | −0.1440 | −0.4233 | −0.0549 | −2.1585 | −28.3874 |
| H | 0.0297 | 0.1968 | 0.1733 | 1.1204 | 18.0710 |
| J | −0.0018 | −0.0360 | −0.0562 | −0.2208 | −4.8737 |

| Surface No. | S6 | S9 | S10 | S11 | S12 |
|---|---|---|---|---|---|
| K | 78.4158 | 15.0436 | −31.2131 | 24.9065 | 0.0000 |
| A | −0.1203 | −0.0911 | 0.2376 | 0.1686 | −0.0599 |
| B | 0.6179 | −0.2475 | −1.3018 | −0.7038 | −0.0132 |
| C | −2.7755 | −0.0742 | 2.2410 | 1.1330 | 0.0524 |
| D | 13.1122 | 1.5332 | −2.1146 | −1.0167 | −0.0335 |
| E | −47.0014 | −2.8618 | 1.1817 | 0.5442 | 0.0051 |
| F | 107.3549 | 2.5660 | −0.3958 | −0.1781 | 0.0026 |
| G | −148.7441 | −1.2548 | 0.0764 | 0.0349 | −0.0012 |
| H | 113.7567 | 0.3211 | −0.0076 | −0.0038 | 0.0002 |
| J | −36.7396 | −0.0336 | 0.0003 | 0.0002 | 0.0000 |

TABLE 18

| Note | S7(XY polynomial) | S8(XY polynomial) |
|---|---|---|
| K | −90.825454010 | 0.000000000 |
| $X^4$ | −0.368603495 | −0.249737565 |
| $X^2*Y^2$ | −0.738703108 | −0.501124122 |
| $Y^4$ | −0.372773121 | −0.255694396 |
| $X^6$ | 0.136447701 | 0.177815919 |
| $X^4*Y^2$ | 0.398790120 | 0.539515778 |
| $X^2*Y^4$ | 0.425483578 | 0.532498668 |
| $Y^6$ | 0.134841284 | 0.198082327 |
| $X^8$ | −0.150768071 | −0.145872113 |
| $X^6*Y^2$ | −0.528024353 | −0.592926840 |
| $X^4*Y^4$ | −0.860252626 | −0.878642471 |
| $X^2*Y^6$ | −0.659911823 | −0.578762816 |
| $Y^8$ | −0.078587342 | −0.166563241 |
| $X^{10}$ | −0.119911776 | 0.092807453 |
| $X^8*Y^2$ | −0.724974748 | 0.457834031 |
| $X^6*Y^4$ | −1.336004995 | 0.958501016 |
| $X^6*Y^6$ | −1.274769066 | 0.892483796 |
| $X^2*Y^8$ | −0.559594893 | 0.472748726 |
| $Y^{10}$ | −0.242256911 | 0.087904185 |

Optical characteristics of the optical imaging systems according to the first to sixth examples are listed in Table 19.

TABLE 19

| Note | First Example | Second Example | Third Example | Fourth Example | Fifth Example | Sixth Example |
|---|---|---|---|---|---|---|
| f number | 1.610 | 1.840 | 2.230 | 2.210 | 2.440 | 2.430 |
| TTL | 5.700 | 5.100 | 7.000 | 5.300 | 5.400 | 5.400 |
| IMGHT | 4.000 | 4.000 | 4.000 | 2.856 | 2.520 | 2.520 |
| FOV | 80.000 | 83.000 | 114.000 | 120.500 | 44.000 | 45.600 |
| f | 4.662 | 4.423 | 2.620 | 1.615 | 6.164 | 5.927 |
| f1 | 4.534 | 4.265 | −5.929 | −2.555 | 2.634 | 2.734 |
| f2 | −12.589 | −9.963 | 2.521 | 8.981 | −6.222 | −6.927 |
| f3 | 61.506 | 35.551 | −7.935 | 3.678 | −20.927 | −21.714 |
| f4 | −23.02 | −49.52 | 2.95 | 2.70 | −10.92 | −13.63 |
| f5 | 2.492 | 3.007 | −3.407 | −3.618 | −3.889 | −5.359 |
| f6 | −2.161 | −2.459 | 20.721 | 5.356 | 7.057 | 12.806 |
| SAGdifSO | 23.7 | 24.9 | 99.0 | 113.0 | 99.0 | 5.0 |
| SAGdifSI | 184.0 | 504.0 | 249.0 | 455.0 | 87.0 | 13.0 |

Conditional expression values of the optical imaging systems according to the first to sixth examples are listed in Table 20.

TABLE 20

| Conditional Expression | First example | Second Example | Third Example | Fourth Example | Fifth Example | Sixth Example |
|---|---|---|---|---|---|---|
| f1/f2 | −0.3602 | −0.4281 | −2.3518 | −0.2845 | −0.4233 | −0.3947 |
| \|f1/f5\| | 1.8194 | 1.4184 | 1.7402 | 0.7062 | 0.6773 | 0.5102 |
| f5/f6 | −1.1532 | −1.2229 | −0.1644 | −0.6755 | −0.5511 | −0.4185 |
| R10/R11 | 1.0072 | 0.9494 | 0.5904 | 2.5057 | 0.1530 | 0.5234 |
| SAGdifSO/ SAGdifSI | 0.1288 | 0.0494 | 0.3976 | 0.2484 | 1.1379 | 0.3846 |
| TTL/ (IMGHT*2) | 0.7125 | 0.6375 | 0.8721 | 0.9315 | 1.0734 | 1.0734 |

As described above, optical performance depending on differences in shapes and sizes between a lens and an image sensor may be improved.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having a refractive power, a second lens having a refractive power, a third lens having a refractive power, a fourth lens having a refractive power, a fifth lens having a refractive power, and a sixth lens having a refractive power sequentially disposed in ascending numerical order along an optical axis of the optical imaging system from an object side of the optical imaging system toward an imaging plane of the optical imaging system,
wherein the optical imaging system has a total of six lenses having a refractive power,
the first lens has a refractive power having a sign different from a sign of a refractive power of the second lens,
an image-side surface of the fifth lens is convex in a paraxial region thereof and an object-side surface of the sixth lens is concave in a paraxial region thereof, or the image-side surface of the fifth lens is concave in the paraxial region thereof and the object-side surface of the sixth lens is convex in the paraxial region thereof, one of the fourth to sixth lenses has an object-side surface having a freeform surface shape and an image-side surface having a freeform surface shape, the first lens has a positive refractive power, the fourth lens has a concave image-side surface in a paraxial region thereof, the sixth lens has a positive refractive power, the optical imaging system satisfies 0.6<TTL/(IMGHT*2)<1.1, where TTL is a distance along the optical axis from an object-side surface of the first lens to the imaging plane, and IMGHT is a height of the imaging plane, and the optical imaging system satisfies 0.1<R10/R11<3.0, where R10 is a radius of curvature of the image-side surface of the fifth lens, and R11 is a radius of curvature of the object-side surface of the sixth lens.

2. The optical imaging system of claim 1, wherein the fourth lens has a negative refractive power.

3. The optical imaging system of claim 1, wherein a half field of view (HFOV) of the optical imaging system is 20 to 46 degrees.

4. The optical imaging system of claim 1, wherein the fifth lens has a negative refractive power.

5. The optical imaging system of claim 4, wherein the image-side surface of the sixth lens is convex in the paraxial region thereof.

6. A camera module comprising:
the optical imaging system of claim 1; and
an image sensor configured to convert an optical signal of the optical imaging system into an electrical signal.

7. A mobile terminal device comprising the camera module of claim 6.

8. A mobile terminal device comprising a plurality of camera modules,
wherein the plurality of camera modules comprise one or more camera modules according to claim 6.

9. The optical imaging system of claim 1, wherein the third lens has a convex object-side surface in a paraxial region thereof.

10. An optical imaging system comprising:
a first lens having a positive refractive power and a convex object-side surface in a paraxial region thereof;
a second lens having a refractive power;
a third lens having a refractive power;
a fourth lens having a refractive power and a concave image-side surface in a paraxial region thereof;
a fifth lens having a negative refractive power; and
a sixth lens having a positive refractive power,
wherein the first to sixth lenses are sequentially disposed in ascending numerical order along an optical axis of the optical imaging system from an object side of the optical imaging system toward an imaging plane of the optical imaging system, the optical imaging system has a total of six lenses having a refractive power, one of the fourth to sixth lenses has an object-side surface having a freeform surface shape and an image-side surface having a freeform surface shape, the optical imaging system satisfies 0.6<TTL/(IMGHT*2)<1.1, where TTL is a distance along the optical axis from the object-side surface of the first lens to the imaging plane, and IMGHT is a height of the imaging plane, and the optical imaging system satisfies 0.1<R10/R11<3.0, where R10 is a radius of curvature of an image-side surface of the fifth lens, and R11 is a radius of curvature of an object-side surface of the sixth lens.

11. The optical imaging system of claim 10, wherein the second lens has a concave image-side surface in a paraxial region thereof.

12. The optical imaging system of claim 10, wherein the image-side surface of the fifth lens is concave in a paraxial region thereof, or the object-side surface of the sixth lens is concave in a paraxial region thereof.

13. A mobile terminal device comprising a plurality of camera modules,
wherein the plurality of camera modules comprise one or more camera modules comprising:
the optical imaging system of claim 10; and
an image sensor configured to convert an optical signal of the optical imaging system into an electrical signal.

14. The optical imaging system of claim 10, wherein the third lens has a convex object-side surface in a paraxial region thereof.

* * * * *